(12) United States Patent
Liu

(10) Patent No.: US 11,195,263 B2
(45) Date of Patent: Dec. 7, 2021

(54) METHOD AND SYSTEM FOR SELECTING AN IMAGE ACQUISITION DEVICE

(71) Applicant: ZHEJIANG DAHUA TECHNOLOGY CO., LTD., Zhejiang (CN)

(72) Inventor: Xiaocheng Liu, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/165,883

(22) Filed: Feb. 2, 2021

(65) Prior Publication Data
US 2021/0183040 A1 Jun. 17, 2021

Related U.S. Application Data

(63) Continuation of application No. PCT/CN2019/099917, filed on Aug. 9, 2019.

(30) Foreign Application Priority Data

Aug. 9, 2018 (CN) .......................... 201810900970.5
Jan. 11, 2019 (CN) .......................... 201910028309.4

(51) Int. Cl.
*H04N 7/18* (2006.01)
*G06T 7/00* (2017.01)

(52) U.S. Cl.
CPC .............. *G06T 7/0002* (2013.01); *H04N 7/18* (2013.01); *G06T 2207/10024* (2013.01); *G06T 2207/20021* (2013.01); *G06T 2207/30168* (2013.01)

(58) Field of Classification Search
CPC ..................... H04N 7/18; G06T 7/0002; G06T 2207/10024; G06T 2207/10021; G06T 2207/30168

(Continued)

(56) References Cited

U.S. PATENT DOCUMENTS 8,937,668 B2 * 1/2015 Tsutsumi .................. G06T 5/50
348/218.1
9,279,297 B2 * 3/2016 Angelle .................. E21B 19/24
(Continued)

FOREIGN PATENT DOCUMENTS

CN 102404602 A 4/2012
CN 104853096 A 8/2015
(Continued)

OTHER PUBLICATIONS

First Office Action in Chinese Application No. 201910028309.4 dated Sep. 17, 2019, 11 pages.
(Continued)

*Primary Examiner* — Trang U Tran
(74) *Attorney, Agent, or Firm* — Metis IP LLC

(57) ABSTRACT

A method and system for selecting an image acquisition device. The method may include obtaining a set of device parameter corresponding to at least one image acquisition device. Each device parameter may correspond to an image acquisition device. The device parameters may include a pixel size, and a focal length. The method may include, for each image acquisition device, determining one or more first evaluation values of a target region based at least on the device parameter of the image acquisition device. Each first evaluation value may correspond to a first installation parameter of the image acquisition device. The method may include designating the image acquisition device as a target image acquisition device in response to a determination that at least one first evaluation value is greater than or equal to an evaluation value threshold. And the method may further include determining at least one target installation parameter of the target image acquisition device from the at least one the first installation parameter corresponding to the at least (Continued)

one first evaluation value which is greater than or equal to the evaluation value threshold.

18 Claims, 12 Drawing Sheets

(58) Field of Classification Search
USPC .............................................. 348/143, 218.1
See application file for complete search history.

(56) References Cited

U.S. PATENT DOCUMENTS

| | | | |
|---|---|---|---|
| 10,620,000 B2 * | 4/2020 | Sakano | G01B 11/26 |
| 10,728,525 B2 * | 7/2020 | Azuma | H04N 13/243 |
| 10,979,653 B2 * | 4/2021 | Kenjo | G06T 7/20 |
| 2010/0259539 A1 | 10/2010 | Papanikolopoulos et al. | |
| 2012/0002058 A1 | 1/2012 | Ning | |
| 2012/0307067 A1 | 12/2012 | Chen et al. | |
| 2013/0147948 A1 | 6/2013 | Higuchi et al. | |
| 2018/0255248 A1 | 9/2018 | Nagasaka et al. | |

FOREIGN PATENT DOCUMENTS

| | | |
|---|---|---|
| CN | 105451009 A | 3/2016 |
| CN | 105678839 A | 6/2016 |
| CN | 106657982 A | 5/2017 |
| CN | 106686375 A | 5/2017 |
| CN | 106951583 A | 7/2017 |
| CN | 107197148 A | 9/2017 |
| CN | 107505611 A | 12/2017 |
| CN | 107592466 A | 1/2018 |
| EP | 2802149 A1 | 11/2014 |
| EP | 2835792 A1 | 2/2015 |
| JP | 2012124839 A | 6/2012 |
| JP | 2015088819 A | 5/2015 |
| WO | 2020030081 A1 | 2/2002 |
| WO | 2017206444 A1 | 12/2017 |

OTHER PUBLICATIONS

International Search Report in PCT/CN2019/099917 dated Oct. 29, 2019, 4 pages.
Written Opinion in PCT/CN2019/099917 dated Oct. 29, 2019, 5 pages.
The Extended European Search Report in European Application No. 19846717.7 dated Jul. 20, 2021, 8 pages.

* cited by examiner

METHOD AND SYSTEM FOR SELECTING AN IMAGE ACQUISITION DEVICE

CROSS REFERENCE

This application is a continuation of International Patent Application No. PCT/CN2019/099917 filed on Aug. 9, 2019, which claims priority of Chinese Patent Application No. 201910028309.4 filed on Jan. 11, 2019, and Chinese Patent Application No. 201810900970.5 filed on Aug. 9, 2018, the entire contents of each of which are hereby incorporated by reference.

TECHNICAL FIELD

The present disclosure generally relates to image monitoring, and more particularly, relates to method and system for selecting an image acquisition device.

BACKGROUND

With the booming of video surveillance, users have high requirements for the clarity of target objects in images. When selecting an image acquisition device for monitoring, the image clarity may be the users' primary consideration.

With the current technology, when selecting an image acquisition device for monitoring, the users may generally choose an image acquisition device recommended by people who is (are) familiar with various image acquisition devices, for example, a salesperson. In this way, the users cannot actually know the degree of clarity of the target objects in the images acquired by the image acquisition device after installation. Thus, the selected image acquisition device may not be suitable for the users' needs, resulting in return and a poor user experience.

Therefore, it is desirable to provide an efficient method and system for selecting an image acquisition device.

SUMMARY

According to an aspect of the present disclosure, a method for selecting an image acquisition device is provided. The method may be implemented on a machine including at least one processor and at least one storage device. The method may include obtaining a set of device parameters corresponding to at least one image acquisition device. Each device parameter may correspond to an image acquisition device. The device parameters may include a pixel size, and a focal length. The method may further include, for each image acquisition device, determining one or more first evaluation values of a target region based at least on the device parameter of the image acquisition device. Each first evaluation value may correspond to a first installation parameter of the image acquisition device. The method may further include designating the image acquisition device as a target image acquisition device in response to a determination that at least one first evaluation value is greater than or equal to an evaluation value threshold. And the method may also include determining at least one target installation parameter of the target image acquisition device from the at least one the first installation parameter corresponding to the at least one first evaluation value which is greater than or equal to the evaluation value threshold.

In some embodiments, the determining the first evaluation value corresponding to the first installation parameter may include dividing the target region into a plurality of sub-regions, for each sub-region, determining a second evaluation value based on the device parameter and the first installation parameter, and determining a first average value of the plurality of second evaluation values as the first evaluation value.

In some embodiments, the first installation parameter may at least include an installation position of the image acquisition device. The determining the second evaluation value may include determining a first vertical distance and a first horizontal distance based on the installation position of the image acquisition device and a location of the sub-region, determining a first distance based on the vertical distance and the horizontal distance, and determining the second evaluation value based on the first distance, the pixel size, and the focal length.

In some embodiments, the first installation parameter may at least include an installation position of the image acquisition device. The determining the second evaluation value may include determining a second vertical distance and a second horizontal distance based on the installation position of the image acquisition device and a location of the sub-region, obtaining a height and a width of the sub-region, determining a first angle and second angle based on the second vertical distance, the second horizontal distance, the height, and the width, determining, based on a preset distortion parameter, a first image height corresponding to the first angle and a second image height corresponding to the second angle. The preset distortion parameter may include a plurality of angle-image height data pairs. And the determining the second evaluation value may also include determining the second evaluation value based on the first image height, the second image height, the width, and the pixel size.

In some embodiments, the determining, based on a preset distortion parameter, a first image height corresponding to the first angle may include determining a plurality of first differences between the first angle and a preset angles included in a first plurality of angle-image height data pairs, obtaining a $1^{st}$ minimum value and a $1^{st}$ second minimum value among the plurality of first difference, determining a first preset angle corresponding to the $1^{st}$ minimum value, and a second preset angle corresponding to the $1^{st}$ second minimum value, determining, based on the first angle-image height data pairs, a first preset image height corresponding to the first preset angle, and a second preset image height corresponding to the second preset angle, and determining the first image height based on the first preset image height and the second preset image height.

In some embodiments, the determining, based on a preset distortion parameter, a second image height corresponding to the second angle may include determining a plurality of second differences between the second angle and a second preset angles included in a second plurality of angle-image height data pairs, obtaining a $2^{nd}$ minimum value and a $2^{nd}$ second minimum value among the plurality of first differences, determining a third preset angle corresponding to the $2^{nd}$ minimum value, and a fourth preset angle corresponding to the $2^{nd}$ second minimum value, determining, based on the second angle-image height data pairs, a third preset image height corresponding to the third preset angle, and a fourth preset image height corresponding to the fourth preset angle, and determining the second image height based on the third preset image height and the fourth preset image height.

In some embodiments, the determining the first evaluation value corresponding to the first installation parameter may include obtaining an image related to the target region, obtaining a space model based on the image, determining a perspective view based on the device parameter, the installation parameter, and the space model, and determining a third evaluation value of a projection plane of the perspective view as the first evaluation value of the target region.

In some embodiments, the determining the third evaluation value of the projection plane of the perspective view may include dividing the projection plane into a plurality of sub-plane, for each sub-plane, determining a line passing through a center of the sub-plane and an installation position of the image acquisition device. The installation position may be included in the installation parameter. The determining the third evaluation value of the projection plane of the perspective view may further include determining an intersection between a target region and the line, determining a second distance between the intersection and the installation position, determining a fourth evaluation value based on the second distance, the pixel size, and the focal length, and determining a second average value of the plurality of fourth evaluation values as the third evaluation value.

In some embodiments, the method may further include for each sub-plane, determining a color corresponding to the sub-plane based on the fourth evaluation value, and at least two color-evaluation value data pairs. The color-evaluation value data pair may include a preset color and a corresponding preset evaluation value. The method may further include expressing a region in the space model with the color. The region may correspond to the sub-plane. And the method may also include adjusting, based on the color expressed space model, the installation parameter of the image acquisition device.

In some embodiments, the method may further include, for a current number of the at least one image acquisition device, obtaining one or more color expressed space models corresponding to the current number of the at least one image acquisition device, respectively, and adjusting the current number of the at least one image acquisition device based on the one or more color expressed space models.

In some embodiments, the method may further include replacing the image acquisition device with a new image acquisition device and/or adjusting the installation parameter corresponding to the image acquisition device in response to a determination that the one or more first evaluation values are less than the evaluation value threshold.

According to an aspect of the present disclosure, a system for selecting an image acquisition device is provided. The system may include at least one storage medium including a set of instructions, and at least one processor in communication with the at least one storage medium. When executing the instructions, the at least one processor may be configured to direct the system to perform operations. The operations may include obtaining a set of device parameters corresponding to at least one image acquisition device. Each device parameter may correspond to an image acquisition device. The device parameters may include a pixel size, and a focal length. The operations may further include, for each image acquisition device, determining one or more first evaluation values of a target region based at least on the device parameter of the image acquisition device. Each first evaluation value may correspond to a first installation parameter of the image acquisition device. The operations may further include designating the image acquisition device as a target image acquisition device in response to a determination that at least one first evaluation value is greater than or equal to an evaluation value threshold. And the operations may also include determining at least one target installation parameter of the target image acquisition device from the at least one the first installation parameter corresponding to the at least one first evaluation value which is greater than or equal to the evaluation value threshold.

According to an aspect of the present disclosure, a non-transitory computer readable medium is provided. The non-transitory computer readable medium may include at least one set of instructions. When executed by at least one processor, the at least one set of instructions may direct the at least one processor to effectuate a method. The method may include obtaining a set of device parameters corresponding to at least one image acquisition device. Each device parameter may correspond to an image acquisition device. The device parameters may include a pixel size, and a focal length. The method may further include, for each image acquisition device, determining one or more first evaluation values of a target region based at least on the device parameter of the image acquisition device. Each first evaluation value may correspond to a first installation parameter of the image acquisition device. The method may further include designating the image acquisition device as a target image acquisition device in response to a determination that at least one first evaluation value is greater than or equal to an evaluation value threshold. And the method may also include determining at least one target installation parameter of the target image acquisition device from the at least one the first installation parameter corresponding to the at least one first evaluation value which is greater than or equal to the evaluation value threshold.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
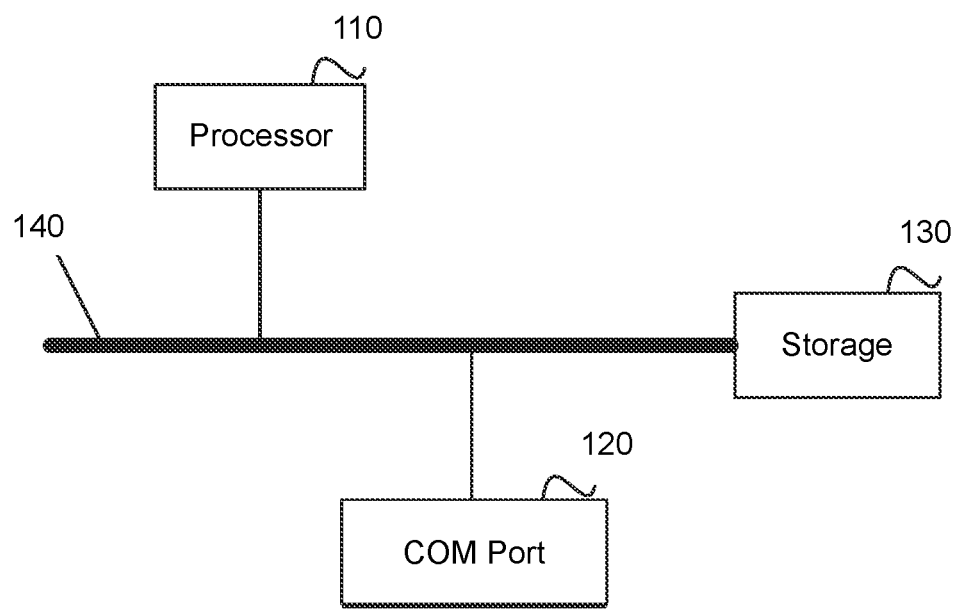
FIG. 1 is a schematic diagram illustrating exemplary hardware and/or software components of an exemplary computing device according to some embodiments of the present disclosure.

The present disclosure technical solution will be described in detail below with reference to the accompanying drawings and specific embodiments. It should be understood that embodiments of the disclosure and specific features in the embodiments are a detailed description of the present disclosure technical solution, rather than a limitation of the present disclosure technical solution. The embodiments of the present disclosure and the technical features in the embodiments may be combined with each other without conflict.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It should be understood that in the description of the embodiments of the present disclosure, terms "first", "second", or the like are used to distinguish descriptions and are not to be construed as indicating or implying a relative importance, nor as an indication or implied order. In the description of the embodiments of the present disclosure, "a plurality of" means two or more.

The term "and/or" in the embodiments of the present disclosure is merely an association describing associated objects, indicating that there may be three relationships. For example, A and/or B may indicate: there are three cases where A exists separately, A and B exist at the same time, and B exists separately. In addition, the character "/" in the present disclosure generally indicates that the contextual object is an "or" relationship.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

FIG. 1 is a schematic diagram illustrating exemplary hardware and/or software components of an exemplary computing device 100 according to some embodiments of the present disclosure. The computing device 100 may include a processor 110, a communication port 120, a storage 130, and a communication bus 140. In some embodiments, the processor 110, the communication port 120 and the storage 130 may communicate with each other via the communication bus 140.

In some embodiments, the computing device 100 may be implemented in a desktop computer, a laptop, a smart phone, a tablet computer, a personal digital assistant (PDA), a network-side device, or the like, or any combination thereof.

The processor 110 may execute computer instructions (e.g., program code) and perform functions in accordance with techniques described herein. The computer instructions may include, for example, routines, programs, objects, components, data structures, procedures, modules, and functions, which perform particular functions described herein. For example, the processor 110 may process device parameter obtained from the storage 130, an image acquisition device, and/or an external storage device. In some embodiments, the processor 110 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), a discrete gate, a transistor logic device, a discrete hardware component, any circuit or processor capable of executing one or more functions, or the like, or a combinations thereof.

Merely for illustration, only one processor is described in the computing device 100. However, it should be noted that the computing device 100 in the present disclosure may also include multiple processors. Thus, operations and/or method steps that are performed by one processor as described in the present disclosure may also be jointly or separately performed by the multiple processors. For example, if in the present disclosure the processor of the computing device 100 executes both operation A and operation B, it should be understood that operation A and operation B may also be performed by two or more different processors jointly or separately in the computing device 100 (e.g., a first processor executes operation A and a second processor executes operation B, or the first and second processors jointly execute operations A and B).

The communication (COM) port 120 may be connected to and from a network connected thereto to facilitate data communications. The COM port 120 may establish connections between components of the computing device 100 and other devices (e.g., the image acquisition device). The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the COM port 120 may be and/or include a standardized communication port, such as RS232, RS485, etc.

The storage 130 may store data/information obtained from the image acquisition device, any other component of the image acquisition device selecting system, an external device, etc. In some embodiments, the storage 130 may include a mass storage, removable storage, a volatile read-and-write memory, a read-only memory (ROM), or the like, or a combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 130 may store one or more programs and/or instructions to perform exemplary methods described in the present disclosure. For example, the storage 130 may store a program for the processor 110 for selecting an image acquisition device. Optionally, the storage 130 may also be at least one storage device located away from the processor 110.

The communication bus 140 may be a peripheral component interconnect (PCI) bus or an extended industry standard architecture (EISA) bus. The communication bus 140 may include an address bus, a data bus, a control bus, or the like. For illustration purpose, only one thick line is shown in the figure, but communication bus 140 is not limited to one bus or one type of bus.

Figure 2:
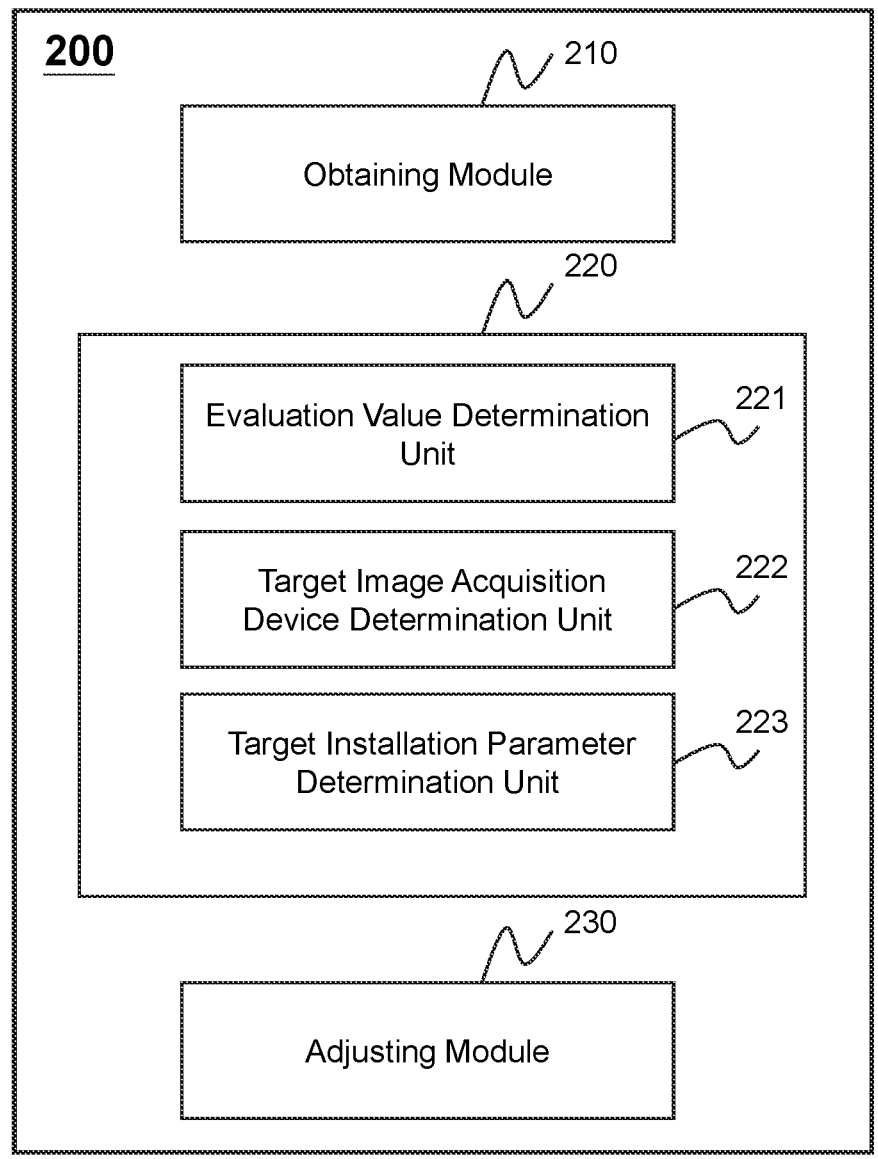
FIG. 2 is a block diagram illustrating an exemplary processing device according to some embodiments of the present disclosure.

FIG. 2 is a block diagram illustrating an exemplary processing device 200 according to some embodiments of the present disclosure. The processing device 200 may include an obtaining module 210, a determination module 220, and an adjusting module 230. One or more of the modules of the processing device 200 may be interconnected. The connection(s) may be wireless or wired.

The obtaining module 210 may be configured to obtain a set of device parameter corresponding to at least one image acquisition device. In some embodiments, the image acquisition device may include any type of cameras and/or sensors which may obtain images and/or video including a plurality of frames. The device parameter may include a pixel size, and a focal length, or the like. Each device parameter may correspond to an image acquisition device. In some embodiments, different models and/or types of image acquisition device may have different device parameters. The device parameter may correspond to the image acquisition device in a one-to-one manner. The device parameter may be stored in one or more storage devices (e.g., the storage 130) in advance. The obtaining module 210 may be configured to obtain the set of device parameter according to the model and/or the type of the at least one image acquisition device from the one or more storage devices via wired or wireless.

The determination module 220 may be configured to determine one or more first evaluation values of a target region based at least on the device parameter of the image acquisition device. The determination module 220 may be further configured to designate the image acquisition device as a target image acquisition device in response to a determination that at least one first evaluation value is greater than or equal to an evaluation value threshold. Furthermore, the determination module 220 may be configured to determine at least one target installation parameter of the target image acquisition device from the at least one the first installation parameter corresponding to the at least one first evaluation value which is greater than or equal to the evaluation value threshold.

In some embodiments, the determination module 220 may further include an evaluation value determination unit 221, a target image acquisition device determination unit 222 and a target installation parameter determination unit 223.

The evaluation value determination unit 221 may be configured to determine one or more first evaluation values of a target region based at least on the device parameter of the image acquisition device. The first evaluation value may be used to indicate the clarity of an image or a video frame of the target region obtained by the image acquisition device. The target region may include a region on a scene where the user wants to monitor using an image acquisition device, or the target region may be a region of interest (ROI) of the user.

In some embodiments, the evaluation value determination unit 221 may be configured to perform different processes to determine the first evaluation value.

In one aspect, the evaluation value determination unit 221 may be configured to determine the first evaluation value based at least on the device parameter of the image acquisition device directly. Specifically, the evaluation value determination unit 221 may be configured to divide the target region into a plurality of sub-regions. For each sub-region, the evaluation value determination unit 221 may be configured to determine a second evaluation value based on the device parameter and the first installation parameter. In some embodiments, the second evaluation value may be used to indicate the clarity of an image or a video frame of each sub-region. Exemplary second evaluation value may include a number of pixels per meter (PPM), and/or a number of pixels per inch (PPI). Further, the evaluation value determination unit 221 may be configured to determine a first average value of the plurality of second evaluation values as the first evaluation value.

In some embodiments, different models and/or types of image acquisition device may correspond to different algorithms for calculating the PPM and/or the PPI. Accordingly, the evaluation value determination unit 221 may be configured to perform different operations to determine the second evaluation values of the different models and/or types of image acquisition device.

For illustration purpose, if the image acquisition device is a normal camera such as a gun-type camera, the evaluation value determination unit 221 may be configured to determine a first vertical distance and a first horizontal distance based on the installation position of the image acquisition device and location of the sub-region. The installation position may refer to a position at which the image acquisition device may be installed. The location of the sub-region may be represented by the location of any point in the sub-region. The evaluation value determination unit 221 may be further configured to determine a first distance based on the first vertical distance and the first horizontal distance. In some embodiments, the first distance may be a straight line distance between the installation position of the image acquisition device and the location of the sub-region. And the evaluation value determination unit 221 may be further configured to determine the second evaluation value based on the first distance, the pixel size, and the focal length.

In some embodiments, if the image acquisition device is a fisheye camera, the evaluation value determination unit 221 may be configured to determine a second vertical distance and a second horizontal distance based on the installation position of the image acquisition device and location of the sub-region. The second vertical distance may be an installation height of the image acquisition device relative to the sub-region (e.g., any point on the bottom of the sub-region). And the second horizontal distance may be a horizontal distance between the image acquisition device (e.g., a center vertical line of the image acquisition device) and the sub-region (e.g., a point with a horizontal distance closest to the image acquisition device in the sub-region). The evaluation value determination unit 221 may be configured to obtain a height and a width of the sub-region. Further, the evaluation value determination unit 221 may be configured to determine a first angle and second angle based on the second vertical distance, the second horizontal distance, the height, and the width. In some embodiments, the first angle may be referred to a minimum angle corresponding to the sub-region in an acquiring view of the image acquisition device. The second angle may be referred to a maximum angle corresponding to the sub-region in an acquiring view of the image acquisition device. Furthermore, the evaluation value determination unit 221 may be configured to determine a first image height corresponding to the first angle and a second image height corresponding to the second angle based on a preset distortion parameter. In some embodiments, the preset distortion parameter may include a plurality of angle-image height data pairs. The evaluation value determination unit 221 may be further configured to determine the second evaluation value based on the first image height, the second image height, the width, and the pixel size.

In some embodiments, to determine a first image height corresponding to the first angle based on a preset distortion parameter, the evaluation value determination unit 221 may be configured to determine a plurality of first differences between the first angle and a preset angles included in a first plurality of angle-image height data pairs. The evaluation value determination unit 221 may be further configured to obtain a $1^{st}$ minimum value and a $1^{st}$ second minimum value among the plurality of first difference. Further, the evaluation value determination unit 221 may be configured to determine a first preset angle corresponding to the $1^{st}$ minimum value, and a second preset angle corresponding to the $1^{st}$ second minimum value. Furthermore, the evaluation value determination unit 221 may be configured to determine a first preset image height corresponding to the first preset angle and a second preset image height corresponding to the second preset angle based on the first angle-image height data pairs. Moreover, the evaluation value determination unit 221 may be configured to determine the first image height based on the first preset image height and the second preset image height.

In some embodiments, to determine a second image height corresponding to the second angle based on a preset distortion parameter, the evaluation value determination unit 221 may be configured to determine a plurality of second differences between the second angle and a second preset angles included in a second plurality of angle-image height data pairs. The evaluation value determination unit 221 may be further configured to obtain a $2^{nd}$ minimum value and a $2^{nd}$ second minimum value among the plurality of first differences. Further, the evaluation value determination unit 221 may be configured to determine a third preset angle corresponding to the $2^{nd}$ minimum value, and a fourth preset angle corresponding to the $2^{nd}$ second minimum value. Furthermore, the evaluation value determination unit 221 may be configured to determine a third preset image height corresponding to the third preset angle and a fourth preset image height corresponding to the fourth preset angle based on the second angle-image height data pairs. Moreover, the evaluation value determination unit 221 may be configured to determine the second image height based on the third preset image height and the fourth preset image height.

In another aspect, the evaluation value determination unit 221 may be configured to determine the first evaluation value based at least on the device parameter of the image acquisition device in a perspective view. Specifically, the evaluation value determination unit 221 may be configured to obtain an image related to the target region. In some embodiments, the target region may occupy a portion of the image, or the entire image. The evaluation value determination unit 221 may be further configured to obtain a space model based on the image. In some embodiments, the space model may exhibit a space scene indicated by the image. The target region may be included in space scene. Furthermore, the evaluation value determination unit 221 may be configured to determine a perspective view based on the device parameter, the installation parameter, and the space model. Moreover, the evaluation value determination unit 221 may be configured to determine a third evaluation value of a projection plane of the perspective view as the first evaluation value of the target region.

In some embodiments, to determine the third evaluation value, the evaluation value determination unit 221 may be configured to divide the projection plane into a plurality of sub-planes. For each sub-plane, the evaluation value determination unit 221 may be configured to determine a line passing through a center of the sub-plane and an installation position of the image acquisition device. In some embodiments, the installation position may be included in the installation parameters. The evaluation value determination unit 221 may be configured to determine an intersection between a target region and the line. Further, the evaluation value determination unit 221 may be configured to determine a second distance between the intersection and the installation position. Furthermore, the evaluation value determination unit 221 may be configured to determine a fourth evaluation value based on the second distance, the pixel size, and the focal length. Moreover, the evaluation value determination unit 221 may be configured to determine a second average value of the plurality of fourth evaluation value as the third evaluation value.

The target image acquisition device determination unit 222 may be configured to designate the image acquisition device as a target image acquisition device in response to a determination that at least one first evaluation value is greater than or equal to an evaluation value threshold. In some embodiments, the evaluation value threshold may be a preset value and stored in one or more storage devices (e.g., the storage 130), or may be adjusted according to different scenarios, which may not be limited in the present disclosure. For the image acquisition device, after determining the one or more first evaluation value corresponding to one or more first installation parameter (i.e., an installation position) of the image acquisition device, respectively, the target image acquisition device determination unit 222 may be configured to compare the first evaluation values with the evaluation value threshold to determine whether there is at least one first evaluation value greater than or equal to the evaluation value threshold. If yes, the target image acquisition device determination unit 222 may be configured to designate the image acquisition device as the target image acquisition device.

The target installation parameter determination unit 223 may be configured to determine at least one target installation parameter of the target image acquisition device from the at least one first installation parameter corresponding to the at least one first evaluation value which is greater than or equal to the evaluation value threshold.

It should be noted that the "first evaluation value is great than or equal to the evaluation value threshold" means that the target image acquisition device installed according to the first installation parameter corresponding to the "first evaluation value" can provide high-clarity images and/or video frames of the target regions. In other words, the first installation parameter corresponding to the "first evaluation value" can ensure the target image acquisition device achieve a preferable monitoring effectiveness. Hence, the target image acquisition device, the first evaluation value which is greater than or equal to the evaluation value threshold, and the first installation parameter are mutually corresponding. In some embodiments, after designating the acquisition device as the target acquisition device, the processor 110 may separately obtain at least one first installation parameter corresponding to the at least one first evaluation value which is greater than or equal to the evaluation value threshold. Then, the target installation parameter determination unit 223 may be configured to determine the at least one target installation parameter of the target image acquisition device from the at least one first installation parameter. In some embodiments, the target installation parameter determination unit 223 may be configured to designate all of the at least one first installation parameter, if more than one, which is greater than or equal to the evaluation value threshold, as the target installation parameter of the target image acquisition device. Optionally, the target installation parameter determination unit 223 may be configured to designate a first installation parameter corresponding to the largest first evaluation value as the target installation parameter of the target image acquisition device.

Additionally or alternatively, in some embodiments, the target installation parameter determination unit 223 may be configured to determine the at least one first installation parameter corresponding to the at least one first evaluation value which is greater than or equal to the evaluation value threshold as candidate installation parameter(s).

For each candidate installation parameter, the target installation parameter determination unit 223 may be configured to determine whether the second evaluation value of each sub-region corresponding to the candidate installation parameter is greater than or equal to the evaluation value threshold. If yes, the target installation parameter determination unit 223 may be configured to determine the candidate installation parameter as the target installation parameter.

In some embodiments, only part of the second evaluation values of the sub-regions corresponding to each candidate installation parameter may be greater than or equal to the evaluation value threshold. In this case, for each candidate installation parameter, the target installation parameter determination unit 223 may be configured to determine a number of sub-regions of which the second evaluation values are greater than or equal to the evaluation value threshold. Then, the target installation parameter determination unit 223 may be configured to determine the candidate installation parameter corresponding to the maximum number as a target installation parameter.

In some embodiments, in order to make the determined target installation parameter more accurate, after determining that the second evaluation value of each sub-region corresponding to the candidate installation parameter is greater than or equal to the evaluation value threshold, before determining the candidate installation parameter as the target installation parameter, target installation parameter determination unit 223 may be further configured to identify a sub-region with the largest second evaluation value, and determine whether the sub-region is a region of interest of the user. If yes, the target installation parameter determination unit 223 may be configured to determine the candidate installation parameter as the target installation parameter.

In some embodiments, there may be one or more region of interest of the user in the target region. For each candidate installation parameter, after determining the second evaluation value of each sub-region, the target installation parameter determination unit 223 may be configured to identify a sub-region with the largest second evaluation value, and determine whether the sub-region is a region of interest to the user. If yes, the target installation parameter determination unit 223 may be configured to determine the candidate installation parameter as the target installation parameter.

The adjusting module 230 may be configured to replace the image acquisition device with a new image acquisition device and/or adjust the installation parameter corresponding to the image acquisition device in response to a determination that the one or more first evaluation values are less than the evaluation value threshold. For example, for an image acquisition device, if the first evaluation value is less than the evaluation value threshold, the adjusting module 230 may be configured to replace the image acquisition device with another image acquisition device, and re-determine the first evaluation value corresponding to each first installation parameter based on the image acquisition device after the replacement, until there is a first evaluation value that is greater than or equal to the evaluation value threshold in the first evaluation values corresponding to each first installation parameter.

In some embodiments, for each sub-plane in the space model, the adjusting module 230 may be configured to determine a color corresponding to the sub-plane based on the fourth evaluation value, and at least two color-evaluation value data pairs. The color-evaluation value data pair may include a preset color and a corresponding preset evaluation value. In some embodiments, the color may have a correspondence with the first evaluation value of the target region. A pixel value such as a RGB value (r, g, b) or a transparency may be used to represent the color. The adjusting module 230 may be further configured to express a region in the space model with the color. In some embodiments, the region may correspond to the sub-plane. Furthermore, the adjusting module 230 may be configured to adjust the installation parameter of the image acquisition device based on the color expressed space model.

In some embodiments, for a current number of the at least one image acquisition device, the adjusting module 230 may be configured to obtain one or more color expressed space models corresponding to the current number of the at least one image acquisition device, respectively. And the adjusting module 230 may be further configured to adjust the current number of the at least one image acquisition device based on the one or more color expressed space model.

It should be noted that the above descriptions of the processing device 200 are provided for the purposes of illustration, and not intended to limit the scope of the present disclosure. For persons having ordinary skills in the art, various modifications and changes in the forms and details of the application of the above method and system may occur without departing from the principles of the present disclosure. Merely by way of example, the processing device 200 may include one or more other modules. However, those variations and modifications also fall within the scope of the present disclosure.

Figure 3:
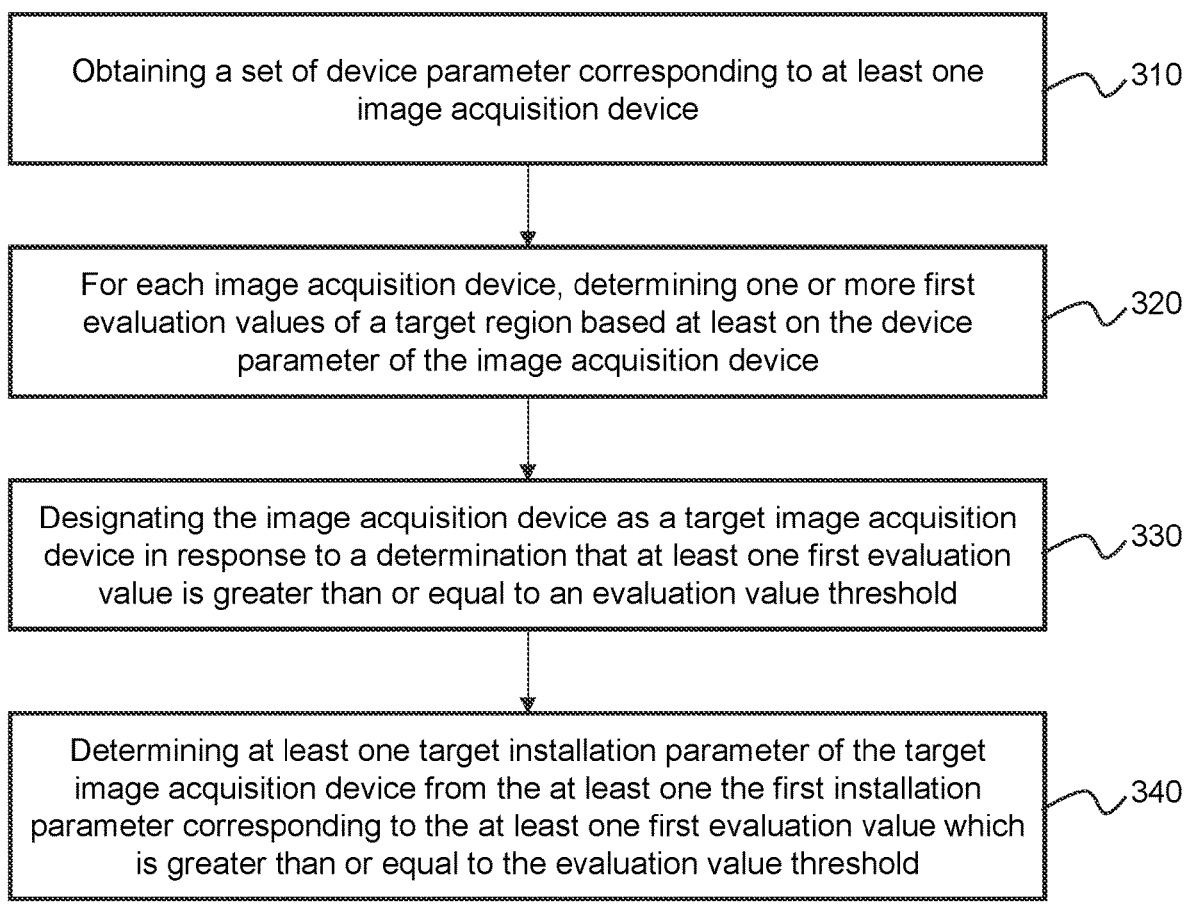
FIG. 3 is a flowchart illustrating an exemplary process for selecting an image acquisition device according to some embodiments of the present disclosure.

FIG. 3 is a flowchart illustrating an exemplary process 300 for selecting an image acquisition device according to some embodiments of the present disclosure. In some embodiments, the process 300 may be executed by the computing device 100. For example, the process 300 may be implemented as a set of instructions (e.g., an application) stored in one or more storage devices (e.g., the storage 130) and invoked and/or executed by the processor 110 (and/or the modules illustrated in FIG. 2). The operations of the process 300 presented below are intended to be illustrative. In some embodiments, the process may be accomplished with one or more additional operations not described, and/or without one or more of the operations discussed. Additionally, the order of the operations of the process 300 as illustrated in FIG. 3 and described below is not intended to be limiting.

In 310, the processor 110 (e.g., the obtaining module 210) may obtain a set of device parameter corresponding to at least one image acquisition device.

In some embodiments, the image acquisition device may include any type of cameras and/or sensors which may obtain images and/or video including a plurality of frames. For example, an exemplary image acquisition device may include a fisheye camera, a normal camera such as a gun-type camera, or the like.

In some embodiments, the device parameter may include a pixel size, and a focal length, or the like. As used herein, the pixel size may refer to an actual physical range of a pixel. And the focal length may refer to a distance over which initially collimated rays are brought to a focus. The focal length may be used as a measure of how strongly an optical system (e.g., the image acquisition device) converges and/or diverges light. In some embodiments, any other device parameter such as a depth of field (DOF), an optical resolution, or the like, may also be included in the device parameter and obtained by the processor 110 (e.g., the obtaining module 210), which may not be limited in the present disclosure.

In some embodiments, each device parameter may correspond to an image acquisition device. It should be noted that the device parameter are the inherent properties of the image acquisition device. After being manufactured, the device parameter of an image acquisition device may be fixed and unique, unless one or more components of the image acquisition is replaced, for example, a len. Therefore, different models and/or types of image acquisition device may have different device parameters. The device parameter may correspond to the image acquisition device in a one-to-one manner. In some embodiments, the device parameter may be stored in one or more storage devices (e.g., the storage 130) in advance. After obtaining a model and/or a type of the at least one image acquisition device, the processor 110 (e.g., the obtaining module 210) may obtain the set of device parameter according to the model and/or the type of the at least one image acquisition device from the one or more storage devices via wired or wireless.

In 320, for each image acquisition device, the processor 110 (e.g., evaluation value determination unit 221) may determine one or more first evaluation values of a target region based at least on the device parameter of the image acquisition device.

In some embodiments, the first evaluation value may be used to indicate the clarity of an image or a video frame of the target region obtained by the image acquisition device. The greater of the first evaluation value, the clearer of the image or the video frame. Exemplary first evaluation value may include a number of pixels per meter (PPM), and/or a number of pixels per inch (PPI). And the number of pixels in a unit of measurement (e.g., one meter, or one inch) may reflect clarity of the image or the video frame from another aspect.

In some embodiments, the target region may include a region on a scene where the user wants to monitor using an image acquisition device, or the target region may be a region of interest (ROI) of the user. One or more objects may occupy and/or pass through the target region. For example, the scene may include an indoor scene, and the target region may include the door of the room. Therefore the user may obtain the information regarding people who have been in and/or out of the room. As another example, the target region may include a jewelry exhibition area of a jewelry store, for preventing the theft of the jewelry. In some embodiments, the target region may be part of the scene (for example, a region occupied by an object), or may be the scene itself, which may not be limited in the present disclosure.

In some embodiments, each first evaluation value may correspond to a first installation parameter of the image acquisition device. It should be understood that different installation parameter indicated by the installation parameter may result in different first evaluation value of the target. For example, for a same image acquisition device and a same target region, the distance between the image acquisition device and the target region may influent the imaging quality. The farther the distance, the worse the quality of images may be. Hence, with different first installation parameters, the processor 110 may obtain different first evaluation values of the target region. In some embodiments, the first installation parameter may at least include an installation position of the image acquisition device. As used herein, the installation position may refer to a position at which an image acquisition device may be installed. In some embodiments, the installation position may be a random position specified by the user. For example, the installation position may be a preferential position of the user, or may be a reasonable position for monitoring the scene. In some embodiments, the first installation parameter(s) of the image acquisition device may be input by the user via the COM port 120, and then transmitted to the processor 110.

In some embodiments, the processor 110 may perform different processes to determine the first evaluation value.

In one aspect, the processor 110 (e.g., the evaluation value determination unit 221) may determine the first evaluation value based at least on the device parameter of the image acquisition device directly. Specifically, the processor 110 (e.g., the evaluation value determination unit 221) may divide the target region into a plurality of sub-regions. For each sub-region, the processor 110 (e.g., the evaluation value determination unit 221) may determine a second evaluation value based on the device parameter and the first installation parameter. In some embodiments, the second evaluation value may be used to indicate the clarity of an image or a video frame of each sub-region. Similar to the first evaluation value, exemplary second evaluation value may include a number of pixels per meter (PPM), and/or a number of pixels per inch (PPI). In some embodiments, for different models and/or types of image acquisition device, different operations may be performed to determine the second evaluation value. The processor 110 (e.g., the evaluation value determination unit 221) may further determine a first average value of the plurality of second evaluation values as the first evaluation value. Details regarding the determination of the first evaluation value may be found in FIG. 4 and the description thereof.

In some embodiments, different models and/or types of image acquisition device may correspond to different algorithms for calculating the PPM and/or the PPI. Accordingly, the processor 110 (e.g., the evaluation value determination unit 221) may perform different operations to determine the second evaluation values of the different models and/or types of image acquisition device.

For illustration purpose, if the image acquisition device is a normal camera such as a gun-type camera, the processor 110 (e.g., the evaluation value determination unit 221) may determine a first vertical distance and a first horizontal distance based on the installation position of the image acquisition device and location of the sub-region. In some embodiments, the installation position may refer to a position at which the image acquisition device may be installed. The location of the sub-region may be represented by the location of any point in the sub-region. The processor 110 (e.g., the evaluation value determination unit 221) may further determine a first distance based on the first vertical distance and the first horizontal distance. In some embodiments, the first distance may be a straight line distance between the installation position of the image acquisition device and the location of the sub-region. And the processor 110 (e.g., the evaluation value determination unit 221) may further determine the second evaluation value based on the first distance, the pixel size, and the focal length. Details regarding the determination of the second evaluation value may be found in FIG. 5 and the description thereof.

In some embodiments, if the image acquisition device is a fisheye camera, the processor 110 (e.g., the evaluation value determination unit 221) may determine a second vertical distance and a second horizontal distance based on the installation position of the image acquisition device and location of the sub-region. In some embodiments, the second vertical distance may be an installation height of the image acquisition device relative to the sub-region (e.g., any point on the bottom of the sub-region). And the second horizontal distance may be a horizontal distance between the image acquisition device (e.g., a center vertical line of the image acquisition device) and the sub-region (e.g., a point with a horizontal distance closest to the image acquisition device in the sub-region). The processor 110 (e.g., the evaluation value determination unit 221) may obtain a height and a width of the sub-region. In some embodiments, the processor 110 (e.g., the evaluation value determination unit 221) may determine boundaries of the sub-region, and obtain the height and the width according to the boundaries. Furthermore, the processor 110 (e.g., the evaluation value determination unit 221) may determine a first angle and second angle based on the second vertical distance, the second horizontal distance, the height, and the width. In some embodiments, the first angle may be referred to a minimum angle corresponding to the sub-region in an acquiring view of the image acquisition device. The second angle may be referred to a maximum angle corresponding to the sub-region in an acquiring view of the image acquisition device. Moreover, the processor 110 (e.g., the evaluation value determination unit 221) may determine a first image height corresponding to the first angle and a second image height corresponding to the second angle based on a preset distortion parameter. In some embodiments, the preset distortion parameter may include a plurality of angle-image height data pairs. The processor 110 (e.g., the evaluation value determination unit 221) may further determine the second evaluation value based on the first image height, the second image height, the width, and the pixel size. Details regarding the determination of the second evaluation value may be found in FIG. 6 and the description thereof.

In some embodiments, to determine a first image height corresponding to the first angle based on a preset distortion parameter, the processor 110 (e.g., the evaluation value determination unit 221) may determine a plurality of first differences between the first angle and a preset angles included in a first plurality of angle-image height data pairs. The processor 110 (e.g., the evaluation value determination unit 221) may further obtain a $1^{st}$ minimum value and a $1^{st}$ second minimum value among the plurality of first difference. Furthermore, the processor 110 (e.g., the evaluation value determination unit 221) may determine a first preset angle corresponding to the $1^{st}$ minimum value, and a second preset angle corresponding to the $1^{st}$ second minimum value. The processor 110 (e.g., the evaluation value determination unit 221) may further determine a first preset image height corresponding to the first preset angle and a second preset image height corresponding to the second preset angle based on the first angle-image height data pairs. And the processor 110 (e.g., the evaluation value determination unit 221) may further determine the first image height based on the first preset image height and the second preset image height. Details regarding the determination of the first image height may be found in FIG. 6 and the description thereof.

In some embodiments, to determine a second image height corresponding to the second angle based on a preset distortion parameter, the processor 110 (e.g., the evaluation value determination unit 221) may determine a plurality of second differences between the second angle and a second preset angles included in a second plurality of angle-image height data pairs. The processor 110 (e.g., the evaluation value determination unit 221) may further obtain a $2^{nd}$ minimum value and a $2^{nd}$ second minimum value among the plurality of first differences. Furthermore, the processor 110 (e.g., the evaluation value determination unit 221) may determine a third preset angle corresponding to the $2^{nd}$ minimum value, and a fourth preset angle corresponding to the $2^{nd}$ second minimum value. The processor 110 (e.g., the evaluation value determination unit 221) may further determine a third preset image height corresponding to the third preset angle and a fourth preset image height corresponding to the fourth preset angle based on the second angle-image height data pairs. And the processor 110 (e.g., the evaluation value determination unit 221) may further determine the second image height based on the third preset image height and the fourth preset image height. Details regarding the determination of the first image height may be found in FIG. 6 and the description thereof.

In another aspect, the processor 110 (e.g., the evaluation value determination unit 221) may determine the first evaluation value based at least on the device parameter of the image acquisition device in a perspective view. Specifically, the processor 110 (e.g., the evaluation value determination unit 221) may obtain an image related to the target region. In some embodiments, the target region may occupy a portion of the image, or the entire image. The processor 110 (e.g., the evaluation value determination unit 221) may further obtain a space model based on the image. In some embodiments, the space model may exhibit a space scene indicated by the image. The target region may be included in space scene. Furthermore, the processor 110 (e.g., the evaluation value determination unit 221) may determine a perspective view based on the device parameter, the installation parameter, and the space model. And the processor 110 (e.g., the evaluation value determination unit 221) may further determine a third evaluation value of a projection plane of the perspective view as the first evaluation value of the target region. More descriptions regarding the determination of the first evaluation value may be found elsewhere in the present disclosure. See, e.g., FIG. 8 and the descriptions thereof.

In some embodiments, to determine the third evaluation value, the processor 110 (e.g., the evaluation value determination unit 221) may divide the projection plane into a plurality of sub-planes. For each sub-plane, the processor 110 (e.g., the evaluation value determination unit 221) may determine a line passing through a center of the sub-plane and an installation position of the image acquisition device. In some embodiments, the installation position may be included in the installation parameters. The processor 110 (e.g., the evaluation value determination unit 221) may determine an intersection between a target region and the line. Furthermore, the processor 110 (e.g., the evaluation value determination unit 221) may determine a second distance between the intersection and the installation position. The processor 110 (e.g., the evaluation value determination unit 221) may further determine a fourth evaluation value based on the second distance, the pixel size, and the focal length. And the processor 110 (e.g., the evaluation value determination unit 221) may further determine a second average value of the plurality of fourth evaluation value as the third evaluation value. More descriptions regarding the determination of the third evaluation value may be found elsewhere in the present disclosure. See, e.g., FIG. 9 and the descriptions thereof.

In 330, the processor 110 (e.g., the target image acquisition device determination unit 222) may designate the image acquisition device as a target image acquisition device in response to a determination that at least one first evaluation value is greater than or equal to an evaluation value threshold.

In some embodiments, the evaluation value threshold may be a preset value and stored in one or more storage devices (e.g., the storage 130), or may be adjusted according to different scenarios, which may not be limited in the present disclosure. For the image acquisition device, after determining the one or more first evaluation value corresponding to one or more first installation parameter (i.e., an installation position) of the image acquisition device, respectively, the processor 110 (e.g., the target image acquisition device determination unit 222) may compare the first evaluation values with the evaluation value threshold to determine whether there is at least one first evaluation value greater than or equal to the evaluation value threshold. If yes, the processor 110 (e.g., the target image acquisition device determination unit 222) may designate the image acquisition device as the target image acquisition device.

In 340, the processor 110 (e.g., the target installation parameter determination unit 223) may determine at least one target installation parameter of the target image acquisition device from the at least one first installation parameter corresponding to the at least one first evaluation value which is greater than or equal to the evaluation value threshold.

It should be noted that the "first evaluation value is great than or equal to the evaluation value threshold" means that the target image acquisition device installed according to the first installation parameter corresponding to the "first evaluation value" can provide high-clarity images and/or video frames of the target regions. In other words, the first installation parameter corresponding to the "first evaluation value" can ensure the target image acquisition device achieve a preferable monitoring effectiveness. Hence, the target image acquisition device, the first evaluation value which is greater than or equal to the evaluation value threshold, and the first installation parameter are mutually corresponding. In some embodiments, after designating the acquisition device as the target acquisition device, the processor 110 may separately obtain at least one first installation parameter corresponding to the at least one first evaluation value which is greater than or equal to the evaluation value threshold. Then, the processor 110 may determine the at least one target installation parameter of the target image acquisition device from the at least one first installation parameter. In some embodiments, the processor 110 may designate all of the at least one first installation parameter, if more than one, which is greater than or equal to the evaluation value threshold, as the target installation parameter of the target image acquisition device. Optionally, the processor 110 may designate a first installation parameter corresponding to the largest first evaluation value as the target installation parameter of the target image acquisition device.

Additionally or alternatively, in some embodiments, the processor 110 may determine the at least one first installation parameter corresponding to the at least one first evaluation value which is greater than or equal to the evaluation value threshold as candidate installation parameter(s).

For each candidate installation parameter, the processor 110 (e.g., the target installation parameter determination unit 223) may determine whether the second evaluation value of each sub-region corresponding to the candidate installation parameter is greater than or equal to the evaluation value threshold. If yes, the processor 110 (e.g., the target installation parameter determination unit 223) may determine the candidate installation parameter as the target installation parameter.

Merely by way of an example, there are three candidate installation parameters including a candidate installation parameter A, a candidate installation parameter B, and a candidate installation parameter C. Firstly, the processor 110 (e.g., the target installation parameter determination unit 223) may determine whether the second evaluation value of each sub-region corresponding to the candidate installation parameter A is greater than or equal to the evaluation value threshold. If yes, the processor 110 (e.g., the target installation parameter determination unit 223) may determine the candidate installation parameter A as the target installation parameter. If not, the processor 110 (e.g., the target installation parameter determination unit 223) may determine whether the second evaluation value of each sub-region corresponding to the candidate installation parameter B is greater than or equal to the evaluation value threshold. If yes, the processor 110 (e.g., the target installation parameter determination unit 223) may determine the candidate installation parameter B as the target installation parameter.

In some embodiments, only part of the second evaluation values of the sub-regions corresponding to each candidate installation parameter may be greater than or equal to the evaluation value threshold. In this case, for each candidate installation parameter, the processor 110 (e.g., the target installation parameter determination unit 223) may determine a number of sub-regions of which the second evaluation values are greater than or equal to the evaluation value threshold. Then, the processor 110 (e.g., the target installation parameter determination unit 223) may determine the candidate installation parameter corresponding to the maximum number as a target installation parameter.

In some embodiments, in order to make the determined target installation parameter more accurate, after determining that the second evaluation value of each sub-region corresponding to the candidate installation parameter is greater than or equal to the evaluation value threshold, before determining the candidate installation parameter as the target installation parameter, the processor 110 (e.g., the target installation parameter determination unit 223) may further identify a sub-region with the largest second evaluation value, and determine whether the sub-region is a region of interest of the user. If yes, the processor 110 (e.g., the target installation parameter determination unit 223) may determine the candidate installation parameter as the target installation parameter.

In some embodiments, there may be one or more region of interest of the user in the target region. For example, the object passed through the target region may be a person, and the region of interest to the user may be a face region of the person. For each candidate installation parameter, after determining the second evaluation value of each sub-region, the processor 110 (e.g., the target installation parameter determination unit 223) may identify a sub-region with the largest second evaluation value, and determine whether the sub-region is a region of interest to the user. If yes, the processor 110 (e.g., the target installation parameter determination unit 223) may determine the candidate installation parameter as the target installation parameter.

For example, if the second evaluation values of each sub-region corresponding to both the candidate installation parameter A and the candidate installation parameter B are greater than or equal to the evaluation value threshold, the processor 110 (e.g., the target installation parameter determination unit 223) may determine whether the sub-regions with the largest second evaluation values corresponding to the candidate installation parameter A and the candidate installation parameter B are the regions of interest to the user, respectively. If the sub-region with the largest second evaluation value corresponding to the candidate installation parameter A is the region of interest to the user, the processor 110 (e.g., the target installation parameter determination unit 223) may determine the candidate installation parameter A as the target installation parameter.

In some embodiments, if the sub-region with the largest second evaluation value is the region of interest to the user, the processor 110 (e.g., the target installation parameter determination unit 223) may determine the candidate installation parameter as the target installation parameter. Therefore, in the image of the target region acquired by the target image acquisition device installed according to the target installation parameter (e.g., at an installation position), the region of interest to the user may have the highest clarity.

In some embodiments, the processor 110 (e.g., the adjusting module 230) may further replace the image acquisition device with a new image acquisition device and/or adjust the installation parameter corresponding to the image acquisition device in response to a determination that the one or more first evaluation values are less than the evaluation value threshold.

For example, for an image acquisition device, if the first evaluation value is less than the evaluation value threshold, the processor 110 (e.g., the adjusting module 230) may replace the image acquisition device with another image acquisition device, and re-determine the first evaluation value corresponding to each first installation parameter based on the image acquisition device after the replacement, until there is a first evaluation value that is greater than or equal to the evaluation value threshold in the first evaluation values corresponding to each first installation parameter. The processor 110 (e.g., the target image acquisition device determination unit 222) may further designate the image acquisition device corresponding to the first evaluation values that is greater than or equal to the evaluation value threshold as a selected target image acquisition device.

In some embodiments, for each first installation parameter (i.e., an installation position), the processor 110 (e.g., the evaluation value determination unit 221) may determine a first evaluation value corresponding to the first installation parameter. And the processor 110 (e.g., the target image acquisition device determination unit 222) may designate the image acquisition device as a target image acquisition device in response to a determination that at least one first evaluation value is greater than or equal to an evaluation value threshold. In this way, the problem that the clarity of the target object in the captured images cannot meet the requirements and cause a return and exchange due to an inappropriate type of the selected image acquisition device may be solved. Moreover, the user experience may be improved.

In some embodiments, for each sub-plane in the space model, the processor 110 (e.g., the adjusting module 230) may determine a color corresponding to the sub-plane based on the fourth evaluation value, and at least two color-evaluation value data pairs. In some embodiments, the color-evaluation value data pair may include a preset color and a corresponding preset evaluation value. In some embodiments, the color may have a correspondence with the first evaluation value of the target region. A pixel value such as a RGB value (r, g, b) or a transparency may be used to represent the color. The processor 110 (e.g., the adjusting module 230) may further express a region in the space model with the color. In some embodiments, the region may correspond to the sub-plane. Furthermore, the processor 110 (e.g., the adjusting module 230) may adjust the installation parameter of the image acquisition device based on the color expressed space model.

In some embodiments, for a current number of the at least one image acquisition device, the processor 110 (e.g., the adjusting module 230) may obtain one or more color expressed space models corresponding to the current number of the at least one image acquisition device, respectively. And the processor 110 (e.g., the adjusting module 230) may further adjust the current number of the at least one image acquisition device based on the one or more color expressed space model.

In some embodiments, after determining the at least one target installation parameter, the processor 110 may display the target installation parameter on a display screen. When the user installs the image acquisition device, the image acquisition device may be installed directly according to the target installation parameter. It is not necessary to repeatedly adjust the installation position, such that the user may install the image acquisition device quickly and conveniently.

It should be noted that the above description regarding the process 300 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 300 may include one or more additional operations or one or more of the operations mentioned above may be omitted. For example, the process 300 may include an operation 350 in which the processor 110 may replace the image acquisition device with a new image acquisition device and/or adjust the installation parameter corresponding to the image acquisition device. In some embodiments, an operation of the process 300 may be divided into a plurality of sub-operations. For example, the operation 320 may be divided into sub-operation 320-1 and 320-2. In the sub-operation 320-1, the processor may determine one or more first evaluation values by determining a second evaluation value for each sub-region. And in the sub-operation 320-2, the processor may determine one or more first evaluation values by determining a third evaluation value of a projection plane of the perspective view. Alternatively or additionally, the sub-operation 320-1 and 320-2 may be performed according to different calculating needs.

Figure 4:
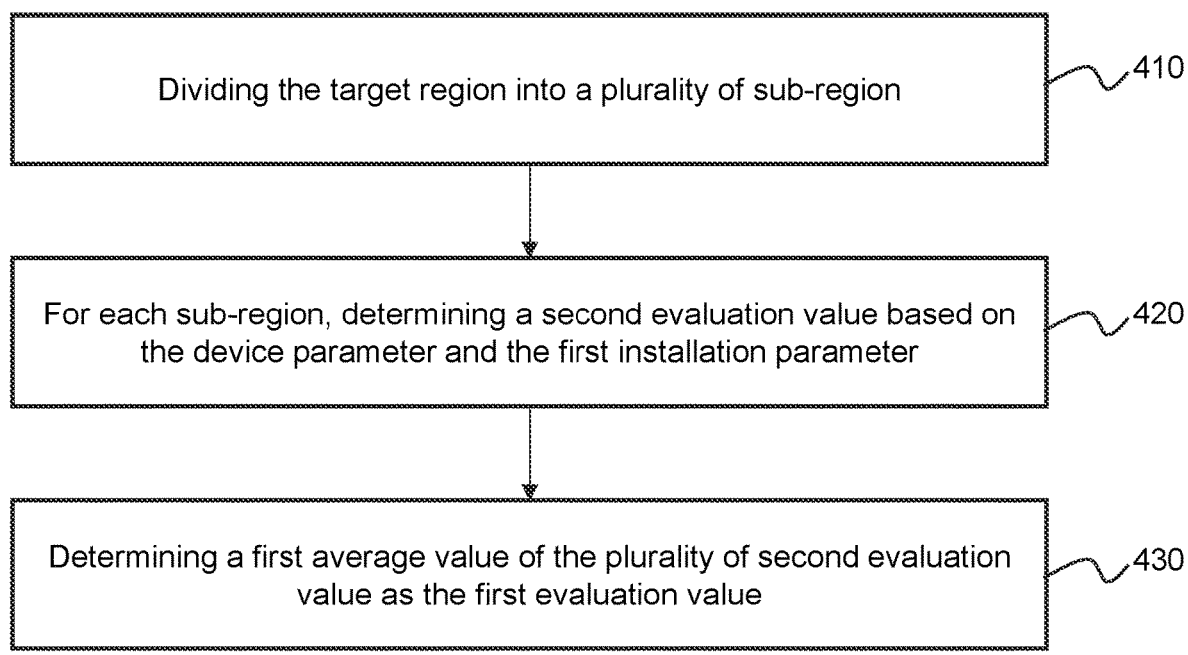
FIG. 4 is a flowchart illustrating an exemplary process for determining a first evaluation value according to some embodiments of the present disclosure.

FIG. 4 is a flowchart illustrating an exemplary process 400 for determining a first evaluation value according to some embodiments of the present disclosure. In some embodiments, the process 400 may be executed by the computing device 100. For example, the process 400 may be implemented as a set of instructions (e.g., an application) stored in one or more storage devices (e.g., the storage 130) and invoked and/or executed by the processor 110 (or the evaluation value determination unit 221 of the determination module 220 illustrated in FIG. 2). The operations of the process 400 presented below are intended to be illustrative. In some embodiments, the process may be accomplished with one or more additional operations not described, and/or without one or more of the operations discussed. Additionally, the order of the operations of the process 400 as illustrated in FIG. 4 and described below is not intended to be limiting. In some embodiments, the operation 320 may be achieved according to the process 400.

In 410, the processor 110 may divide the target region into a plurality of sub-region.

In some embodiments, the target region may include a region in a scene that the user wants to monitor using an image acquisition device, or the target region may be a region of interest (ROI) of the user. One or more objects may occupy and/or pass through the target region. For example, the scene may include an indoor scene, and the target region may include the door of the room. Therefore the user may obtain the information regarding people who have been in and/or out of the room. As another example, the target region may include a jewelry exhibition area of a jewelry store, for preventing the theft of the jewelry. In some embodiments, the target region may be part of the scene (for example, a region occupied by an object), or may be the scene itself, which may not be limited in the present disclosure.

In some embodiments, the processor 110 may determine a monitoring region (e.g., a part or all of the scene) as the target region. For example, the processor 110 may determine the region occupied by an object (referred to as "object region" herein and after) as the target region. As another example, the processor 110 may enlarge the object region, for example, extend each boundary of the object region outward by a preset distance to obtain the target region. As still another example, the processor 110 may determine the whole scene as the target region. In some embodiments, the processor 110 may divide the target region according to a preset rule to obtain a plurality of sub-region. For example, the processor 110 may divide the target region into a plurality of sub-region in any shape. Optionally, the processor 110 may divide the target region into a plurality of sub-region in a cube shape or a cuboid shape.

In 420, for each sub-region, the processor 110 may determine a second evaluation value based on the device parameter and the first installation parameter.

In some embodiments, the second evaluation value may be used to indicate the clarity of an image or a video frame of each sub-region. The greater of the second evaluation value, the clearer of the image or the video frame of each sub-region. Exemplary second evaluation value may include a number of pixels per meter (PPM), and/or a number of pixels per inch (PPI). And the number of pixels in a unit of measurement (e.g., one meter, or one inch) may reflect a clarity of the image or the video frame of each sub-region from another aspect. In some embodiments, different models and/or types of image acquisition device may correspond to different algorithms for calculating the PPM and/or the PPI. Accordingly, the processor 110 may perform different operations to determine the second evaluation values of the different models and/or types of image acquisition device.

In some embodiments, if the image acquisition device is a normal camera such as a gun-type camera, the processor 110 may determine a first vertical distance and a first horizontal distance based on the installation position of the image acquisition device and a location of the sub-region. In some embodiments, the installation position may refer to a position at which the image acquisition device may be installed. The location of the sub-region may be represented by the location of any point in the sub-region. In some embodiments, the installation position of the image acquisition device and/or the location of the sub-region may be expressed in terms of coordinates. The processor 110 may determine the first vertical distance and the first horizontal distance according to the one or more set of coordinates. The processor 110 may further determine a first distance based on the vertical distance and the horizontal distance. In some embodiments, the first distance may be a straight line distance between the installation position of the image acquisition device and the location of the sub-region. The processor 110 may determine the first distance by using the Pythagorean theorem and/or the formula of distance. And the processor 110 may further determine the second evaluation value based on the first distance, the pixel size, and the focal length, for example, by using an equation. Details regarding the determination of the second evaluation value may be found in FIG. 5 and the description thereof.

In some embodiments, if the image acquisition device is a fisheye camera, the processor 110 may determine a second vertical distance and a second horizontal distance based on the installation position of the image acquisition device and a location of the sub-region. The processor 110 may obtain a height and a width of the sub-region. In some embodiments, the processor 110 may determine boundaries of the sub-region, and obtain the height and the width according to the boundaries. Furthermore, the processor 110 may determine a first angle and a second angle based on the second vertical distance, the second horizontal distance, the height, and the width. In some embodiments, the first angle may be referred to as a minimum angle corresponding to the sub-region in an acquiring view of the image acquisition device. The second angle may be referred to as a maximum angle corresponding to the sub-region in an acquiring view of the image acquisition device. The processor 110 may determine the first angle and the second angle by using equations. Moreover, the processor 110 may determine a first image height corresponding to the first angle and a second image height corresponding to the second angle based on a preset distortion parameter. In some embodiments, the preset distortion parameter may include a plurality of angle-image height data pairs (e.g., represented in a correspondence table). The processor 110 may determine the first image height and the second image height according to the correspondence table and/or using a linear interpolation algorithm. The processor 110 may further determine the second evaluation value based on the first image height, the second image height, the width, and the pixel size. Details regarding the determination of the second evaluation value may be found in FIG. 6 and the description thereof.

In 430, the processor 110 may determine a first average value of the plurality of second evaluation value as the first evaluation value.

In some embodiments, the processor 110 may calculate an average value of the plurality of second evaluation values of the plurality of sub-regions, and determine the average value as the first average value. In some embodiments, first evaluation value may be used to indicate the clarity of an image or a video frame of the target region obtained by the image acquisition device.

In some embodiments, in order to enable the user to observe the second evaluation value of each sub-region more intuitively, each sub-region may be assigned an identifier to distinguish other sub-regions. For example, if the processor 110 divides the target region into 10 sub-regions, the assigned identifier of the sub-region may be 1 to 10. After determining the second evaluation value of each sub-region, the processor 110 may further generate an evaluation curve based on the assigned identifier of each sub-region and the second evaluation value of each sub-region. For example, the assigned identifier of the sub-regions may be designated as the coordinate value of the horizontal axis, and the second evaluation value of the sub-regions may be designated as the coordinate value of the vertical axis. As another example, the assigned identifier of the sub-regions may be designated as the coordinate value of the vertical axis, and the second evaluation value of the sub-regions may be designated as the coordinate value of the horizontal axis. The processor 110 may transmit the evaluation curve to a display for displaying the evaluation curve to the user. According to the evaluation curve, the user may obtain the information that whether the second evaluation value of each sub-region is greater than or equal to an evaluation value threshold quickly.

It should be noted that the above description regarding the process 400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 400 may include one or more additional operations or one or more of the operations mentioned above may be omitted. In some embodiments, an operation of the process 400 may be divided into a plurality of sub-operations. For example, the operation 420 may be divided into operation 420-1 and 420-2, in operation 420-1, the processor 110 may determine the second evaluation value based on the first distance, the pixel size, and the focal length, and in operation 420-2, the processor 110 may determine the second evaluation value based on the first image height, the second image height, the width, and the pixel size.

Figure 5:
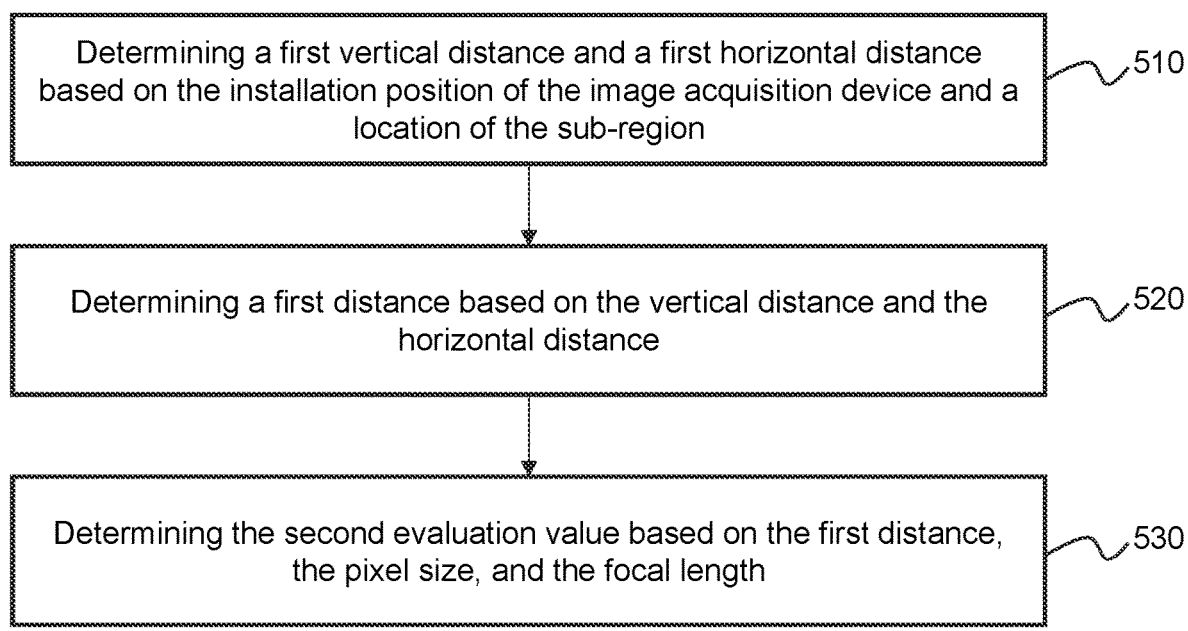
FIG. 5 is a flowchart illustrating an exemplary process for determining a second evaluation value according to some embodiments of the present disclosure.

FIG. 5 is a flowchart illustrating an exemplary process 500 for determining a second evaluation value according to some embodiments of the present disclosure. In some embodiments, the process 500 may be executed by the computing device 100. For example, the process 500 may be implemented as a set of instructions (e.g., an application) stored in one or more storage devices (e.g., the storage 130) and invoked and/or executed by the processor 110 (or the evaluation value determination unit 221 of the determination module 220 illustrated in FIG. 2). The operations of the process 500 presented below are intended to be illustrative. In some embodiments, the process may be accomplished with one or more additional operations not described, and/or without one or more of the operations discussed. Additionally, the order of the operations of the process 500 as illustrated in FIG. 5 and described below is not intended to be limiting. In some embodiments, the operation 420 may be achieved according to the process 500.

In 510, the processor 110 may determine a first vertical distance and a first horizontal distance based on the installation position of the image acquisition device and a location of the sub-region.

In some embodiments, the installation position may refer to a position at which the image acquisition device may be installed, for example, on a wall or a traffic light pole. The location of the sub-region may be represented by the location of any point in the sub-region. For example, if the sub-region is in a cube shape, the location of the sub-region may be represented by a center point of the cube. In some embodiments, the installation position of the image acquisition device and/or the location of the sub-region may be expressed in terms of coordinates, for example, utilizing the world coordinate system. The processor 110 may determine the first vertical distance and the first horizontal distance according to the one or more set of coordinates of the installation position of the image acquisition device and the location of the sub-region.

In some embodiments, the first vertical distance may be an installation height of the image acquisition device relative to the sub-region (e.g., the any point on the bottom of the sub-region). And the first horizontal distance may be a horizontal distance between the image acquisition device (e.g., a center vertical line of the image acquisition device) and the sub-region (e.g., the any point in the target region). Optionally, the first vertical distance and the first horizontal distance may be pre-determined in advance, for example, the processor 110 may obtain the first vertical distance and the first horizontal distance input by the user via the COM port 120. The first vertical distance and the first horizontal distance may also be adjusted according to different scenarios, for example, the installation parameter may be changed in response to the situation that there is no first evaluation value greater than or equal to the evaluation value threshold.

In 520, the processor 110 may determine a first distance based on the vertical distance and the horizontal distance.

In some embodiments, the first distance may be a straight line distance between the installation position of the image acquisition device and the location of the sub-region. The processor 110 may determine the first distance based on the vertical distance and the horizontal distance by using the Pythagorean theorem. Additionally or alternatively, the processor 110 may determine the first distance based on the coordinates of the installation position of the image acquisition device and the location of the sub-region according to the formula of distance directly.

In 530, the processor 110 may determine the second evaluation value based on the first distance, the pixel size, and the focal length.

In some embodiments, exemplary second evaluation value may include a number of pixels per meter (PPM), and/or a number of pixels per inch (PPI). And as used herein, the pixel size may refer to an actual physical range of a pixel. And the focal length may refer to a distance over which initially collimated rays are brought to a focus. The focal length may be used as a measure of how strongly an optical system (e.g., the image acquisition device) converges and/or diverges light. Details regarding the obtaining of the pixel size and the focal length may be found in FIG. 3 and the description thereof.

For illustration purpose, the image acquisition device may be a normal camera, and the second evaluation value may be a number of pixels per meter (PPM). The processor 110 may determine the second evaluation value based on the first distance, the pixel size, and the focal length according to following Equation (1):

$$\text{PPM} = L_L/L_D/\text{pixelsize} \tag{1}$$

wherein $L_L$ denotes the focal length, $L_D$ denotes the first distance, and pixelsize denotes the pixel size.

In some embodiments, the processor 110 may first determine a plurality of first ratios between each focal length of the image acquisition device and the first distance based on a pre-stored first distance. After that, the processor may determine a second ratio between a maximum value of the plurality of first ratios and the pixel size of the image acquisition device as the second evaluation value. In some embodiments, the first distance may be determined according to the first vertical distance and the first horizontal distance (e.g., using the Pythagorean theorem or the formula of distance to determine the first distance) and stored in advance (e.g., in the storage 130).

For illustration purpose, the processor 110 may determine the first distance according to the first vertical distance and the first horizontal distance of the image acquisition device using the Pythagorean theorem in advance, and then store the first distance. Further, the processor 110 may determine the plurality of first ratios between each focal length and the first distance based on the first distance and each focal length within the focal length range of the image acquisition device. The maximum value in the plurality of first ratios may then be identified by the processor 110, and the second ratio between the maximum value of the plurality of first ratios and the pixel size of the image acquisition device may be determined as the second evaluation value. In some embodiments, the second evaluation value may be the PPM.

For example, the focal lengths of the image acquisition device may include a, b, c, d, and e, respectively. The processor 110 may determine a plurality of first ratios between each focal length and the first distance and obtain five first ratios. The maximum value in the plurality of first ratios may then be identified by the processor 110, and the second ratio between the maximum value of the plurality of first ratios and the pixel size of the image acquisition device may be determined as the second evaluation value. In some embodiments, the second evaluation value may be the PPM.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 500 may include one or more additional operations or one or more of the operations mentioned above may be omitted. In some embodiments, an operation of the process 500 may be divided into a plurality of sub-operations.

Figure 6:
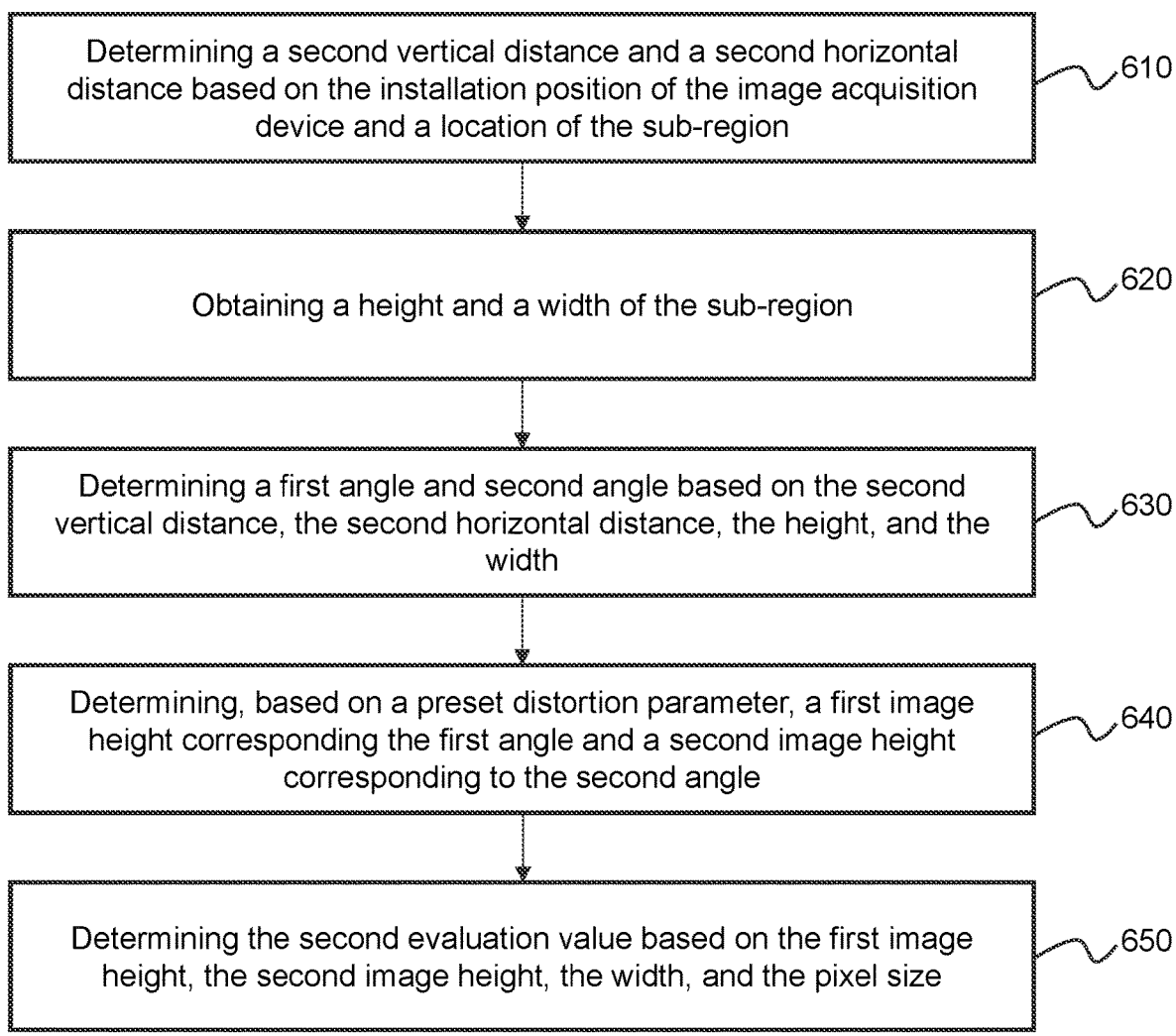
FIG. 6 is a flowchart illustrating another exemplary process for determining a second evaluation value according to some embodiments of the present disclosure.

FIG. 6 is a flowchart illustrating an exemplary process 600 for determining a second evaluation value according to some embodiments of the present disclosure. In some embodiments, the process 600 may be executed by the computing device 100. For example, the process 600 may be implemented as a set of instructions (e.g., an application) stored in one or more storage devices (e.g., the storage 130) and invoked and/or executed by the processor 110 (or the evaluation value determination unit 221 of the determination module 220 illustrated in FIG. 2). The operations of the process 600 presented below are intended to be illustrative. In some embodiments, the process may be accomplished with one or more additional operations not described, and/or without one or more of the operations discussed. Additionally, the order of the operations of the process 600 as illustrated in FIG. 6 and described below is not intended to be limiting. In some embodiments, the operation 420 may be achieved according to the process 600.

In 610, the processor 110 may determine a second vertical distance and a second horizontal distance based on the installation position of the image acquisition device and a location of the sub-region.

In some embodiments, the installation position may refer to a position at which the image acquisition device may be installed, for example, on a wall or a traffic light pole. The location of the sub-region may be represented by a location of any point in the sub-region. For example, if the sub-region is in a cube shape, the location of the sub-region may be represented by a center point of the cube. In some embodiments, the installation position of the image acquisition device and/or the location of the sub-region may be expressed in terms of coordinates, for example, utilizing the world coordinate system. The processor 110 may determine the second vertical distance and the second horizontal distance according to the one or more set of coordinates of the installation position of the image acquisition device and the location of the sub-region.

In some embodiments, the second vertical distance may be an installation height of the image acquisition device relative to the sub-region (e.g., the any point on the bottom of the sub-region). And the second horizontal distance may be a horizontal distance between the image acquisition device (e.g., a center vertical line of the image acquisition device) and the sub-region (e.g., a point with a horizontal distance closest to the image acquisition device in the sub-region). Optionally, the second vertical distance and the second horizontal distance may be pre-determined in advance, for example, the processor may obtain the second vertical distance and the second horizontal distance input by the user via the COM port 120. The second vertical distance and the second horizontal distance may also be adjusted according to different scenarios, for example, the installation parameter may be changed in response to the situation that there is no second evaluation value greater than or equal to the evaluation value threshold.

In 620, the processor 110 may obtain a height and a width of the sub-region.

In some embodiments, the processor 110 may determine boundaries of the sub-region. For example, the boundaries of the sub-region may include a top border, a bottom border, a left border, a right border, a front border, and a rear border of the sub-region. Assuming that a person stands at the installation position of the image acquisition device, the front border of the sub-region may be a border facing the person, and the rear border of the sub-region may be a border opposite of the front border. Therefore, the height may be referred to as a height between the top border and the bottom border, the width may be referred to as a width between the left border and the right border. Optionally, the height and the width may be pre-determined and stored (e.g., in the storage 130) in advance, for example, the processor 110 may obtain the height and the width of the sub-region input by the user via the COM port 120.

In 630, the processor 110 may determine a first angle and second angle based on the second vertical distance, the second horizontal distance, the height, and the width.

In some embodiments, the first angle may be referred to as a minimum angle corresponding to the sub-region in an acquiring view of the image acquisition device. The second angle may be referred to as a maximum angle corresponding to the sub-region in an acquiring view of the image acquisition device.

In some embodiments, the processor 110 may determine the first angle based on the second vertical distance and the second horizontal distance, and determine the second angle based on the second vertical distance, the second horizontal distance, the width and the height of the sub-region. Taking FIG. 7 as an example, the processor 110 may determine the first angle and the second angle according to following Equation (2) and Equation (3):

$$B = \arctan(X_1/Y_1) \quad (2)$$

$$A = \arctan((X_1+X_2)/(Y_1-Y_2)) \quad (3)$$

where B denotes the first angle, A denotes the second angle, arctan denotes an inverse tangent function, $X_1$ denotes the second horizontal distance, $Y_1$ denotes the second vertical distance, $X_2$ denotes the width of the sub-region, and $Y_2$ denotes the height of the sub-region.

In 640, the processor 110 may determine a first image height corresponding to the first angle and a second image height corresponding to the second angle based on a reset distortion parameter.

In some embodiments, the preset distortion parameter may include a plurality of angle-image height data pairs. Each angle-image height data pair may include an angle and an image height corresponding to the angle. For the image acquisition device (e.g., a fisheye camera), it may have a correspondence table which represents the preset distortion parameter in form of table. Exemplary correspondence table of a certain image acquisition device may be shown as follows:

| Angel | Image height |
|---|---|
| 0 | 0 |
| 0.89 | 0.02216056 |
| 1.78 | 0.04431848 |
| 2.67 | 0.06647142 |
| 3.56 | 0.08861707 |
| 4.45 | 0.11075307 |
| 5.34 | 0.13287711 |
| 6.23 | 0.15498686 |
| 7.12 | 0.17707997 |
| 8.01 | 0.19915412 |
| 8.9 | 0.22120697 |
| 9.79 | 0.24323617 |
| 10.68 | 0.2652394 |
| 11.57 | 0.28721431 |
| 12.46 | 0.30915855 |
| 13.35 | 0.33106978 |
| 14.24 | 0.35294563 |
| 15.13 | 0.37478376 |
| 16.02 | 0.3965818 |
| 16.91 | 0.41833739 |
| 17.8 | 0.44004815 |
| 18.69 | 0.46171171 |
| 19.58 | 0.48332567 |
| 20.47 | 0.50488765 |
| 21.36 | 0.52639525 |
| 22.25 | 0.54784605 |
| 23.14 | 0.56923763 |
| 24.03 | 0.59056758 |
| 24.92 | 0.61183344 |
| 25.81 | 0.63303276 |
| 26.7 | 0.65416309 |
| 27.59 | 0.67522334 |
| 28.48 | 0.69621035 |
| 29.37 | 0.71712089 |
| 30.26 | 0.73795243 |
| 31.15 | 0.75870242 |
| 32.04 | 0.7793683 |
| 32.93 | 0.79994749 |
| 33.82 | 0.82043737 |
| 34.71 | 0.84083531 |
| 35.6 | 0.86113867 |
| 36.49 | 0.88134476 |
| 37.38 | 0.90145089 |
| 38.27 | 0.92145432 |
| 39.16 | 0.94135229 |
| 40.05 | 0.961142 |
| 40.94 | 0.98082064 |
| 41.83 | 1.00038535 |
| 42.72 | 1.01983324 |
| 43.61 | 1.03916137 |
| 44.5 | 1.05836678 |
| 45.39 | 1.0774471 |
| 46.28 | 1.09639943 |
| 47.17 | 1.11521985 |
| 48.06 | 1.13390522 |
| 48.95 | 1.15245235 |
| 49.84 | 1.17085803 |
| 50.73 | 1.18911897 |
| 51.62 | 1.20723185 |
| 52.51 | 1.2251933 |
| 53.4 | 1.24299991 |
| 54.29 | 1.26064818 |
| 55.18 | 1.27813462 |
| 56.07 | 1.29545563 |
| 56.96 | 1.31260759 |
| 57.85 | 1.32958684 |
| 58.74 | 1.34638965 |
| 59.63 | 1.36301225 |
| 60.52 | 1.37945083 |
| 61.41 | 1.39570152 |
| 62.3 | 1.41176042 |
| 63.19 | 1.42762389 |
| 64.08 | 1.4432887 |
| 64.97 | 1.45874975 |

-continued

| Angel | Image height |
|---|---|
| 65.86 | 1.47400303 |
| 66.75 | 1.48904449 |
| 67.64 | 1.5038701 |
| 68.53 | 1.51847579 |
| 69.42 | 1.53285751 |
| 70.31 | 1.54701121 |
| 71.2 | 1.56093286 |
| 72.09 | 1.57461852 |
| 72.98 | 1.58806475 |
| 73.87 | 1.60126706 |
| 74.76 | 1.61422158 |
| 75.65 | 1.62692452 |
| 76.54 | 1.63937218 |
| 77.43 | 1.65156094 |
| 78.32 | 1.66348726 |
| 79.21 | 1.67514774 |
| 80.1 | 1.68653909 |
| 80.99 | 1.69765813 |
| 81.88 | 1.70850292 |
| 82.77 | 1.71906964 |
| 83.66 | 1.72935556 |
| 84.55 | 1.73935815 |
| 85.44 | 1.74907505 |
| 86.33 | 1.75850404 |
| 87.22 | 1.7676431 |
| 88.11 | 1.77649037 |
| 89 | 1.78504418 |
| 90 | 1.79359799 |

In some embodiments, the processor 110 may determine the first image height corresponding to the first angle and the second image height corresponding to the second angle, according to the first angle, the second angle, and the correspondence table including the plurality of angle-image height data pairs. For example, if the first angle is 22 degree, the first image height may be 0.81 meter, and if the second image angle is 35 degree, the second image height may be 1.26 meter.

In some embodiments, if there is no same angle as the first angle and/or the second angle in the correspondence table, the processor 110 may determine one or more angles closest to the first angle and/or the second angle in the correspondence table respectively, and determine the first image height and the second image height based on the closest angles respectively. Taking the above table as an example, if the first angle is 25.8 degree, an angle closest to the first angle in the correspondence table may be 26 degree, and the image height corresponding to the closest angle may be 0.94 meter. That is, the first image height corresponding to the first angle may be determined as 0.94 meter. If the second angle is 44.3 degree, an angle closest to the second angle in the correspondence table may be 44 degree, and the image height corresponding to the closest angle may be 1.56 meter. That is, the second image height corresponding to the second angle may be determined as 1.56 meter.

In some embodiments, to determine a first image height corresponding to the first angle based on a preset distortion parameter, the processor 110 may determine a plurality of first differences between the first angle and preset angles included in a first plurality of angle-image height data pairs. In some embodiments, the first plurality of angle-image height data pairs may include a first plurality of preset angles, which may correspond to a first plurality of image heights in one-to-one manner. In some embodiments, the processor 110 may determine a plurality of differences between the first angle and each of the preset angles, and further determine a plurality of absolute values of the plurality of differences as the plurality of first differences. In some embodiments, the processor 110 may further obtain a $1^{st}$ minimum value and a 1st second minimum value among the plurality of first differences. Further, the processor 110 may determine a first preset angle corresponding to the $1^{st}$ minimum value, and a second preset angle corresponding to the $1^{st}$ second minimum value. For example, each of the plurality of preset angles may correspond to a first difference, and the processor 110 may determine the first preset angle and/or the second preset angle according to the correspondence between the each of the plurality of preset angles and the first difference. In some embodiments, the processor 110 may further determine a first preset image height corresponding to the first preset angle and a second preset image height corresponding to the second preset angle based on the first angle-image height data pairs. Furthermore, the processor 110 may determine the first image height based on the first preset image height and the second preset image height. In some embodiments, the processor 110 may determine the first image height by using a linear interpolation algorithm. For example, the processor 110 may determine the first image height according to following Equation (4):

$$H_B = H_{BH} - \frac{(H_{BH} - H_{BL})(G_{BH} - B)}{G_{BH} - G_{BL}} \qquad (4)$$

wherein $H_B$ denotes the first image height, $H_{BH}$ denotes the first preset image height, $H_{BL}$ denotes the second preset image height, $G_{BH}$ denotes the first preset angle, B denotes the first angle, and $G_{BL}$ denotes the second preset angle.

In some embodiments, to determine a second image height corresponding to the first angle based on a preset distortion parameter, the processor 110 may determine a plurality of second differences between the second angle and preset angles included in a second plurality of angle-image height data pairs. In some embodiments, the second plurality of angle-image height data pairs may include a second plurality of preset angles, which may correspond to a plurality of image heights in one-to-one manner. Optionally, the second plurality of angle-image height data pairs may be the same as the first plurality of angle-image height data pairs. In some embodiments, the processor 110 may determine a plurality of differences between the second angle and each of the second preset angles, and further determine a plurality of absolute values of the plurality of differences as the plurality of second differences. In some embodiments, the processor 110 may further obtain a $2^{st}$ minimum value and a $2^{st}$ second minimum value among the plurality of second differences. Further, the processor 110 may determine a third preset angle corresponding to the $2^{st}$ minimum value, and a fourth preset angle corresponding to the $2^{st}$ second minimum value. For example, each of the plurality of second preset angles may correspond to a second difference, and the processor 110 may determine the third preset angle and/or the fourth preset angle according to the correspondence between the each of the plurality of second preset angles and the second difference. In some embodiments, the processor 110 may further determine a third preset image height corresponding to the third preset angle and a fourth preset image height corresponding to the fourth preset angle based on the second angle-image height data pairs. Furthermore, the processor 110 may determine the second image height based on the third preset image height and the fourth preset image height. In some embodiments, the processor

110 may determine the second image height by using a linear interpolation algorithm. For example, the processor 110 may determine the second image height according to following Equation (5):

$$H_A = H_{AH} - \frac{(H_{AH} - H_{AL})(G_{AH} - A)}{G_{AH} - G_{AL}} \qquad (5)$$

wherein $H_A$ denotes the second image height, $H_{AH}$ denotes the third preset image height, $H_{AL}$ denotes the fourth preset image height, $G_{AH}$ denotes the third preset angle, A denotes the second angle, and $G_{AL}$ denotes the fourth preset angle.

For illustration purpose, in some embodiments, if there are preset angles that are same as the first angle and the second angle in the correspondence table respectively, the processor 110 may determine a first image height corresponding to the first angle and a second image height corresponding to the second angle according to the correspondence table.

In some embodiments, if there is no preset angle that is same as the first angle and/or the second angle in the correspondence table, the processor 110 may determine a second preset angle that is closest to and is less than the first angle, a first preset angle that is closest to and is larger than the first angle, a fourth preset angle that is closest to and less than the second angle and a third preset angle that is closest to and larger than the second angle in the correspondence table. Furthermore, the processor 110 may determine the first image height corresponding to the first angle and the second image height corresponding to the second angle by using a linear interpolation algorithm based on the preset angles and the corresponding image heights.

For example, when determining the first image height corresponding to the first angle and the second image height corresponding to the second angle, the processor 110 may determine whether there are preset angles that are the same as the first angle and the second angle in the correspondence table respectively. If yes, the processor 110 may determine the first image height corresponding to the first angle and the second image height corresponding to the second angle respectively according to the correspondence table.

As another example, if there is no preset angle that is the same as the first angle and/or the second angle in the correspondence table, the processor 110 may determine a second preset angle that is closest to and is less than the first angle and a first preset angle that is closest to and is larger than the first angle. The processor 110 may further determine, according to the correspondence table, a second preset image height corresponding to the second preset angle and a first preset image height corresponding to the first preset angle. Furthermore, according to the first angle, the first preset angle, the second preset angle, the first preset image height corresponding to the first preset angle and the second preset image height corresponding to the second preset angle, the processor 110 may determine the first image height corresponding to the first angle by using a linear interpolation algorithm.

Similarly, when determining the second image height corresponding to the second angle, the processor 110 may determine a fourth preset angle that is closest to and is less than the second angle, and a third preset angle that is closest to and is larger than the second angle. And the processor 110 may further determine, according to the correspondence table, a fourth preset image height corresponding to the fourth preset angle and a third preset image height corresponding to the third preset angle. Furthermore, according to the second angle, the third preset angle, the fourth preset angle, the third preset image height corresponding to the third preset angle, and the fourth preset image height corresponding to the fourth preset angle, the processor 110 may determine the second image height corresponding to the second angle by using a linear interpolation algorithm.

In 650, the processor 110 may determine the second evaluation value based on the first image height, the second image height, the width, and the pixel size.

In some embodiments, after determining the first image height and the second image height, the processor 110 may calculate a difference between the second image height and the first image height, and calculate a third ratio between the difference and the width of the sub-region. And the processor 110 may further determine a fourth between the third ratio and the pixel size of the image acquisition device as the second evaluation value. In some embodiments, the second evaluation value may be the PPM.

For example, the processor 110 may determine the second evaluation value according to following Equation (6):

$$PPM=(H_B-H_A)/X_2/\text{pixelsize} \qquad (6)$$

wherein $H_B$ denotes the first image height, $H_A$ denotes the second image height, $X_2$ denotes the width of the sub-region, and pixelsize denotes the pixel size of the image acquisition device.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 600 may include one or more additional operations or one or more of the operations mentioned above may be omitted. In some embodiments, an operation of the process 600 may be divided into a plurality of sub-operations. For example, the operation 640 may be divided into operation 640-1 and 640-2, in operation 640-1, the processor 110 may determine the first image height corresponding to the first angle, and in operation 640-2, the processor 110 may determine the second image height corresponding to the second angle.

Figure 7:
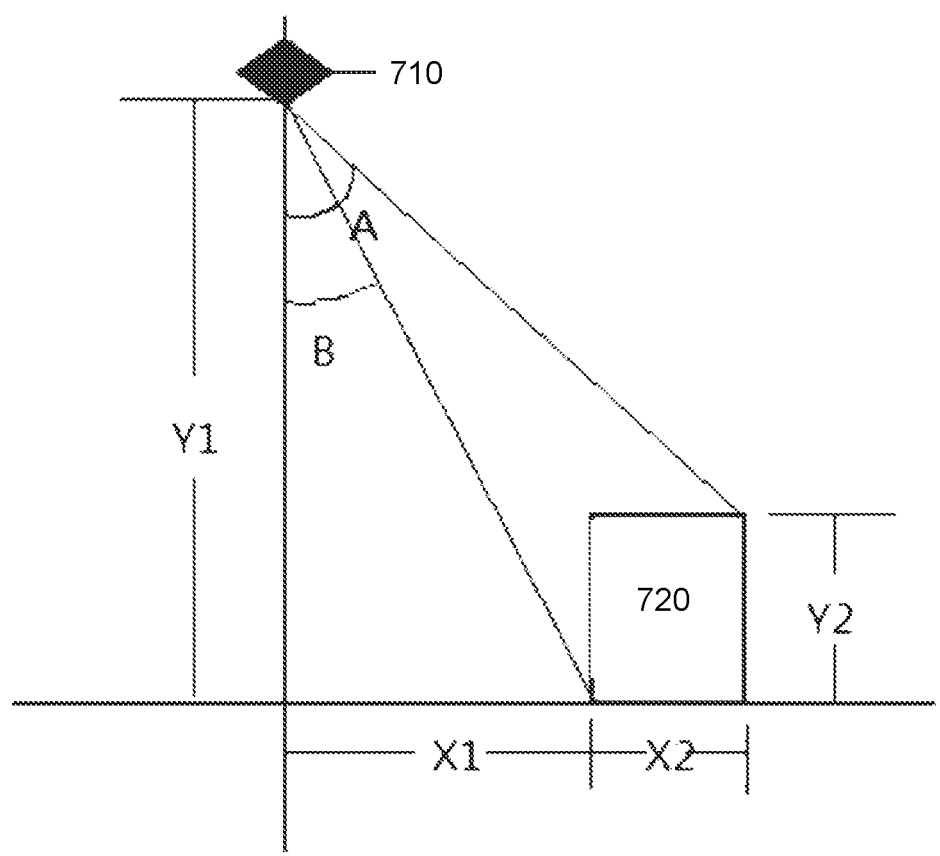
FIG. 7 is a schematic diagram illustrating exemplary relative positions between an image acquisition device and a target region according to some embodiments of the present disclosure.

FIG. 7 is a schematic diagram illustrating an exemplary relative positions between an image acquisition device and a target region (or a sub-region) according to some embodiments of the present disclosure according to some embodiments of the present disclosure.

As shown in FIG. 7, an image acquisition device 710 (e.g., a fisheye camera) is installed at a position with a second horizontal distance $X_1$ and second vertical distance $Y_1$ relative to a target region 720. Optionally, the target region 720 may also be referred to as a sub-region. Accordingly, B represents the first angle, A represents the second angle, $X_2$ represents the width of the sub-region, and $Y_2$ represents the height of the sub-region.

Figure 8:
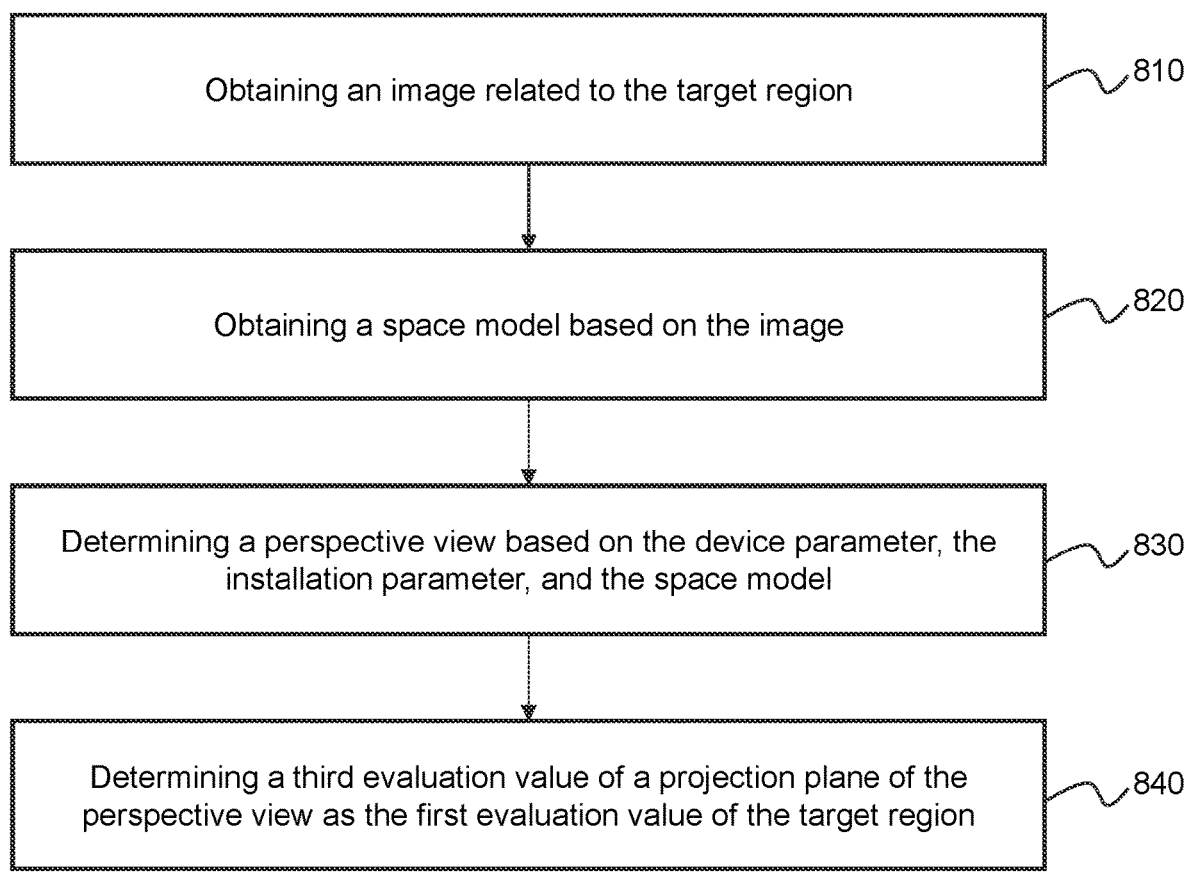
FIG. 8 is a flowchart illustrating another exemplary process for determining a first evaluation value according to some embodiments of the present disclosure.

FIG. 8 is a flowchart illustrating an exemplary process 800 for determining a first evaluation value according to some embodiments of the present disclosure. In some embodiments, the process 800 may be executed by the computing device 100. For example, the process 800 may be implemented as a set of instructions (e.g., an application) stored in one or more storage devices (e.g., the storage 130) and invoked and/or executed by the processor 110 (or the evaluation value determination unit 221 of the determination module 220 illustrated in FIG. 2). The operations of the process 800 presented below are intended to be illustrative. In some embodiments, the process may be accomplished with one or more additional operations not described, and/or without one or more of the operations discussed. Additionally, the order of the operations of the process 800 as illustrated in FIG. 8 and described below is not intended to be limiting. In some embodiments, the operation 320 may be achieved according to the process 800.

In 810, the processor 110 may obtain an image related to the target region.

In some embodiments, the processor 110 may obtain the image from cameras and/or sensors which may obtain images and/or video including a plurality of frames. The cameras and/or sensors may already be installed at one or more positions in the scene for obtaining images and/or videos. Additionally, the cameras and/or sensors may also be included in a mobile device (e.g., a mobile phone), which may be used to obtain images and/or videos at any position. In some embodiments, the image may be obtained and stored (e.g., in the storage 130) in advance.

In some embodiments, the image related to the target region may include a 2D image, a 3D image, or the like. In some embodiments, the target region may occupy a portion, or all of the image.

In 820, the processor 110 may obtain a space model based on the image.

In some embodiments, the space model may exhibit a space scene indicated by the image. The target region may be included in space scene. Exemplary space model may include a 3D space model such as a surface model, a volumetric model, a mixed model, or the like, or any combination thereof. In some embodiments, the processor 110 may obtain the space model based on the image by using one or more modeling algorithms such as an engraving algorithm, a distance function algorithm, a surface growth algorithm, a mapping algorithm, or the like, or any combination thereof. Optionally, the processor 110 may also establish a coordinate system for the space model.

In 830, the processor 110 may determine a perspective view based on the device parameter, the installation parameter, and the space model.

In some embodiments, the processor 110 may determine a perspective view of the complete shooting scene of the image. In some embodiments, the processor 110 may determine a perspective view of portion of the shooting scene of the image including the target region.

Figure 11:
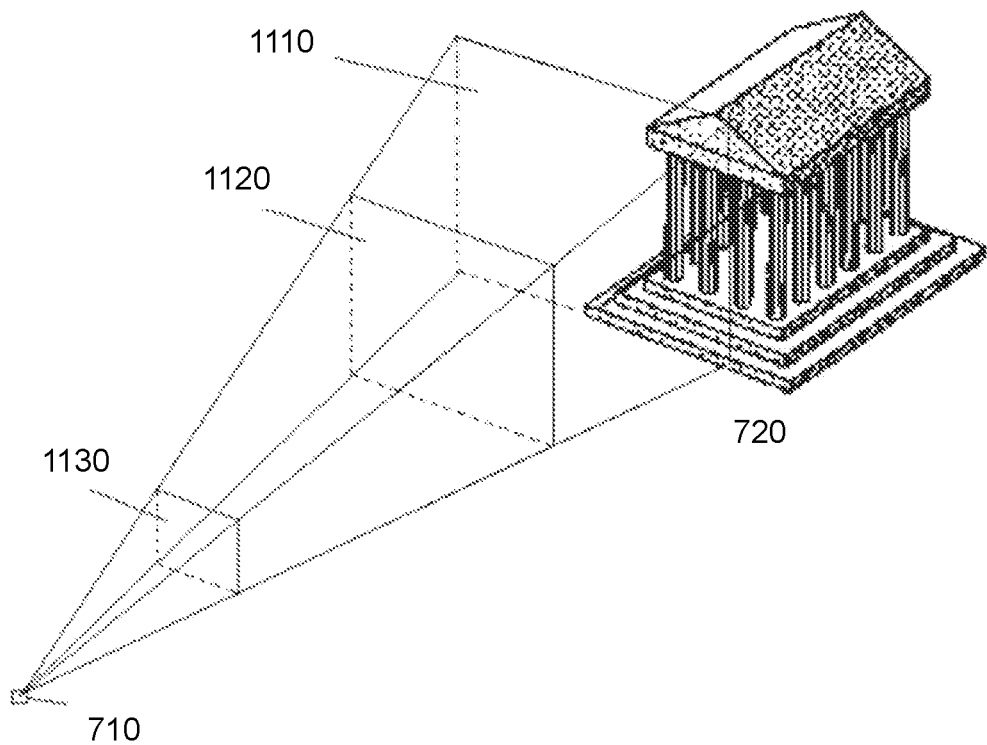
FIG. 11 is schematic diagrams illustrating an exemplary perspective view according to some embodiments of the present disclosure.

In some embodiments, in order to monitor the target region in all directions, the processor 110 may determine one or more preset installation positions at each direction of the target region in the space model. As used herein, the preset installation position may be referred to as the installation position included in the first parameter. The image acquisition device may be simulated installed at each of the preset installation positions. And the processor 110 may determine whether the image acquisition device is a target image acquisition device based on the first evaluation value corresponding to the preset installation position. In some embodiments, the device parameter may further include a vertical viewing angle and a horizontal viewing angle. The installation parameter may further include an installation vertical viewing angle and an installation horizontal viewing angle. Based on the focal length, the vertical viewing angle, the horizontal viewing angle, the installation vertical viewing angle, and the installation horizontal viewing angle of the image acquisition device, the processor 110 may determine a 3D perspective view for the image acquisition device simulated installed at the preset installation position in the space model. The perspective view may include the target region. Referring to FIG. 11, FIG. 11 is a schematic diagram illustrating an exemplary 3D perspective view according to some embodiments of the present disclosure. As shown in FIG. 11, the perspective view may include the image acquisition device 710, the target region 720, a front section 1130, a projection plane 1120, and a back section 1110. The image acquisition device 710 may located at the preset installation location, and the size of the projection plane 1120 may be changed according to the degree of the vertical viewing angle and the horizontal viewing angle.

In some embodiments, the operation of determining a perspective view of the image acquisition device according to the focal length, the vertical viewing angle, the horizontal viewing angle, the installation vertical viewing angle, and the installation horizontal viewing angle of the image acquisition device may be achieved according to the prior art, which will not be described herein again.

In some embodiments, in the perspective view, the processor 110 may project the target region onto the projection plane 1120. A projection image of the target region may be obtained on the projection plane 1120.

In 840, the processor 110 may determine a third evaluation value of a projection plane of the perspective view as the first evaluation value of the target region. As used herein, the projection plane may refer to a type of view in which graphical projections from the target region intersect. Referring to FIG. 11, the projection plane 1120 may be an exemplary projection plane.

In some embodiments, the processor 110 may divide the projection plane into a plurality of sub-planes, for example, according to a preset rule. For each sub-plane, the processor 110 may determine a line passing through the center of the sub-plane and the installation position of the image acquisition device. The installation position may be included in the installation parameter. Merely by way of an example, the center and the installation position may be expressed in terms of coordinates in a space coordinate system, respectively. The processor 110 may directly connect the center of the sub-plane and the installation position to obtain the line. The processor 110 may further determine an intersection between a target region and the line. For example, the target region may also be represented by a set of coordinates. Any one of common points between the line and an outline of the target region may be designated as the intersection. The processor 110 may further determine a second distance between the intersection and the installation position, for example, according to the coordinates of the intersection and the coordinates of the installation position. Further, the processor 110 may determine a fourth evaluation value based on the second distance, the pixel size, and the focal length. Similar to the first evaluation value, exemplary fourth evaluation value may include a number of pixels per meter (PPM), and/or a number of pixels per inch (PPI). Furthermore, the processor 110 may determine a second average value of the plurality of fourth evaluation value as the third evaluation value. Details regarding the determination of the third evaluation value may be found in FIG. 9 and the description thereof.

It should be noted that the above description regarding the process 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 800 may include one or more additional operations or one or more of the operations mentioned above may be omitted. In some embodiments, an operation of the process 800 may be divided into a plurality of sub-operations.

Additionally, the process 800 may be performed simultaneously or separately with the process 400 for determining the first evaluation value. In some embodiments, the process 800 may be interchanged with the process 400.

Figure 9:
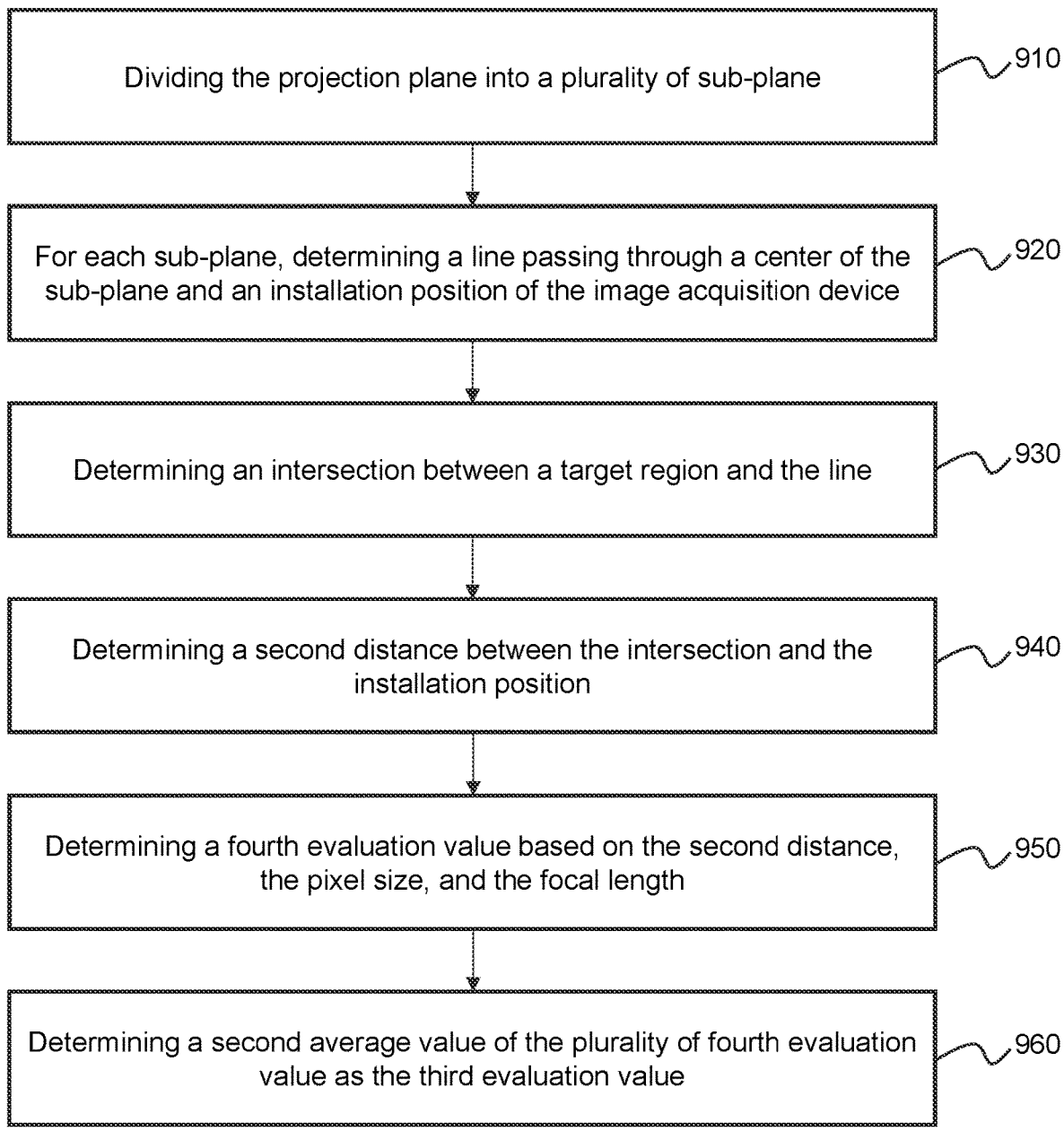
FIG. 9 is a flowchart illustrating an exemplary process for determining a third evaluation value according to some embodiments of the present disclosure.

FIG. 9 is a flowchart illustrating an exemplary process 900 for determining a third evaluation value according to some embodiments of the present disclosure. In some embodiments, the process 900 may be executed by the computing device 100. For example, the process 900 may be implemented as a set of instructions (e.g., an application) stored in one or more storage devices (e.g., the storage 130) and invoked and/or executed by the processor 110 (or the evaluation value determination unit 221 of the determination module 220 illustrated in FIG. 2). The operations of the process 900 presented below are intended to be illustrative. In some embodiments, the process may be accomplished with one or more additional operations not described, and/or without one or more of the operations discussed. Additionally, the order of the operations of the process 900 as illustrated in FIG. 9 and described below is not intended to be limiting. In some embodiments, the operation 840 may be achieved according to the process 900.

In 910, the processor 110 may divide the projection plane into a plurality of sub-planes.

Figure 12:
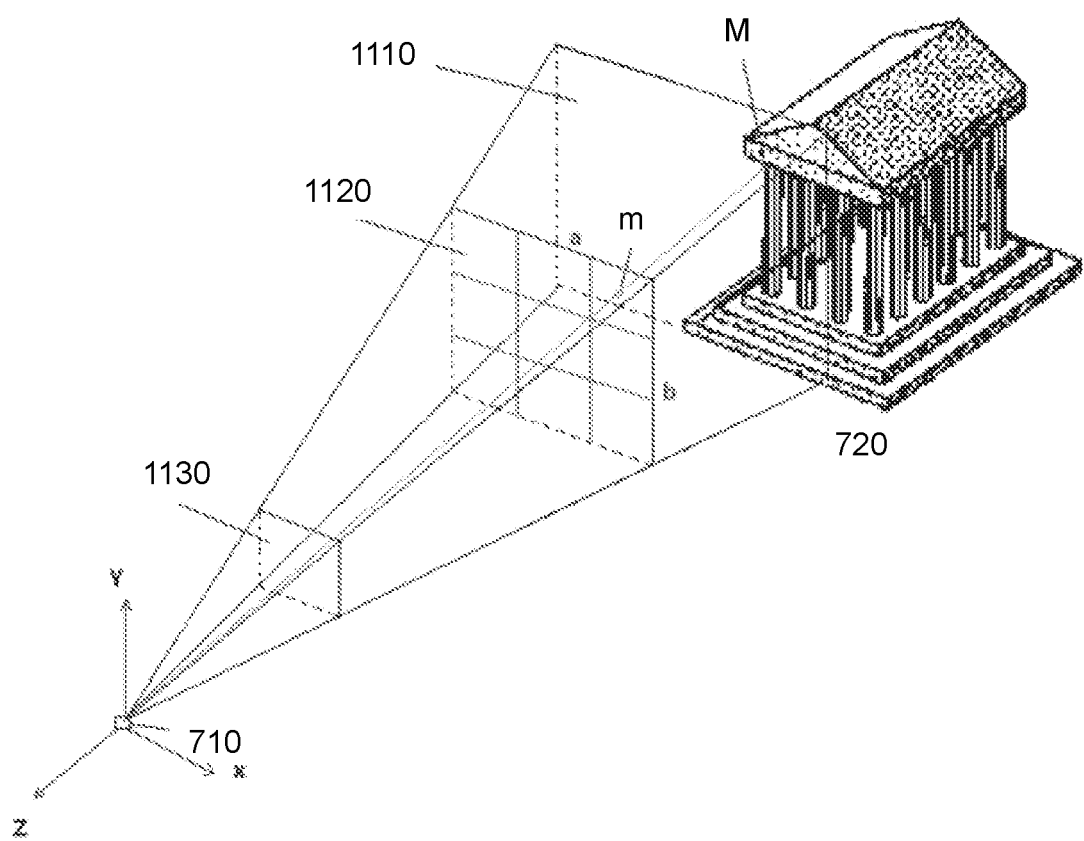
FIG. 12 is a schematic diagram illustrating an exemplary perspective view with a plurality of sub-planes according to some embodiments of the present disclosure.

In some embodiments, after obtaining the projection plane, the processor 110 may divide the projection plane according to a preset rule to obtain a plurality of sub-planes. Specifically, the processor 110 may divide the projection plane according to a resolution of the image acquisition device to obtain the plurality of sub-planes. For example, if the resolution of the image acquisition device is a*b, the processor 110 may divide the projection plane into a*b sub-planes. FIG. 12 is a schematic diagram illustrating an exemplary perspective view with the plurality of sub-planes.

In 920, for each sub-plane, the processor 110 may determine a line passing through a center of the sub-plane and an installation position of the image acquisition device. In some embodiments, the installation position may be included in the installation parameter.

For the convenience of calculation (e.g., to determine the first evaluation value of the target region), after obtaining the perspective view, the processor 110 may generate a space coordinate system with the position of the image acquisition device as an origin, and with the Z axis perpendicular to the projection plane. Thus, each sub-plane may have a range of coordinates in the space coordinate system, and the center of the sub-plane may easily be identified from the range of the coordinates. The center of the sub-region may be assigned a coordinate (e.g., $x_1$, $y_1$, $z_1$). Similarly, the installation position of the image acquisition device may also be assigned a coordinate (e.g., 0, 0, 0), for the origin of the space coordinate system is the installation position. In some embodiments, the line may at least include a straight line. The processor 110 may directly connect the center of the sub-plane and an installation position to obtain the line. In some embodiments, the line may be represented by a linear equation such as $z=ax+by+c$. For example, the processor 110 may determine the linear equation based on the coordinates of the center of the sub-plane and an installation position.

In 930, the processor 110 may determine an intersection between a target region and the line.

In some embodiments, the target region may also be represented by a set of coordinates. The set of coordinates may consist of a plurality of points, lines and/or areas. Those points, lines and/or areas may have their own expressions (e.g., coordinates for a point, a formula for a line or an area), and constitute the outline of the target region. Thus, the processor 110 may determine one or more common points between the line and the outline of the target region based on the linear equation of the line and the expressions of those points, lines and/or areas. Among the one or more common points, the processor 110 may designate any one as the intersection. Preferably, the processor 110 may designate the first common points generated between the line and the outline of the target region as the intersection.

In 940, the processor 110 may determine a second distance between the intersection and the installation position. In some embodiments, the processor 110 may determine the second distance according to the coordinates of the intersection and the coordinates of the installation position directly. In some embodiments, the processor 110 may determine a third vertical distance and a third horizontal distance based on the coordinates of the intersection. The third vertical distance may be referred to as a vertical distance between the intersection to the installation position, and the third horizontal distance may be referred to as a horizontal distance between the intersection to the installation position. Subsequently, the processor 110 may determine the second distance based on the third vertical distance and a third horizontal distance using the Pythagorean theorem.

In 950, the processor 110 may determine a fourth evaluation value based on the second distance, the pixel size, and the focal length.

For illustration purpose only, the description of operation 950 may refer to FIG. 12. FIG. 12 is a schematic diagram illustrating an exemplary perspective view with a plurality of sub-planes and a coordinate system according to some embodiments of the present disclosure. As shown in FIG. 12, for a certain sub-plane, the coordinates of the center of the certain sub-plane may be m with a coordinate $(x_m, y_m, z_m)$. According to the coordinates of the center m and the installation position, the processor 110 may determine the intersection M between the line and the target region 720. The line may pass through the center m and the installation position of the image acquisition device. The coordinates of the intersection M may be determined as $(x_M, y_M, z_M)$. Then, the processor 110 may determine the second distance $L_D$, coordinates of the intersection and the coordinates of the installation position directly using a formula of distance. Optionally, the processor 110 may determine the third vertical distance and the third horizontal distance according to the coordinates of the intersection M, and further determine the second distance $L_D$, based on the third vertical distance and the horizontal distance. Next, the processor 110 may determine the fourth evaluation value PPM' of the sub-plan according to the pixel size pixelsize, the focal length $L_L$, and the second distance $L_D$. Merely by way of an example, the processor 110 may determine the fourth evaluation value PPM' of the sub-plane according to following Equation (7):

$$PPM'=L_L/L_D'/pixelsize \quad (7)$$

wherein PPM' denotes the fourth evaluation value, $L_L$ denotes the focal length, $L_D'$ denotes the second distance, and pixelsize denotes the pixel size of the image acquisition device. In some embodiments, if the line generated based on the installation position and a center of a certain sub-plane have no intersection with the target region, the fourth evaluation value corresponding to the certain sub-plane may be determined as 0.

In 960, the processor 110 may determine a second average value of the plurality of fourth evaluation value as the third evaluation value.

It should be noted that the above description regarding the process 900 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 900 may include one or more additional operations or one or more of the operations mentioned above may be omitted. In some embodiments, an operation of the process 900 may be divided into a plurality of sub-operations.

Figure 10:
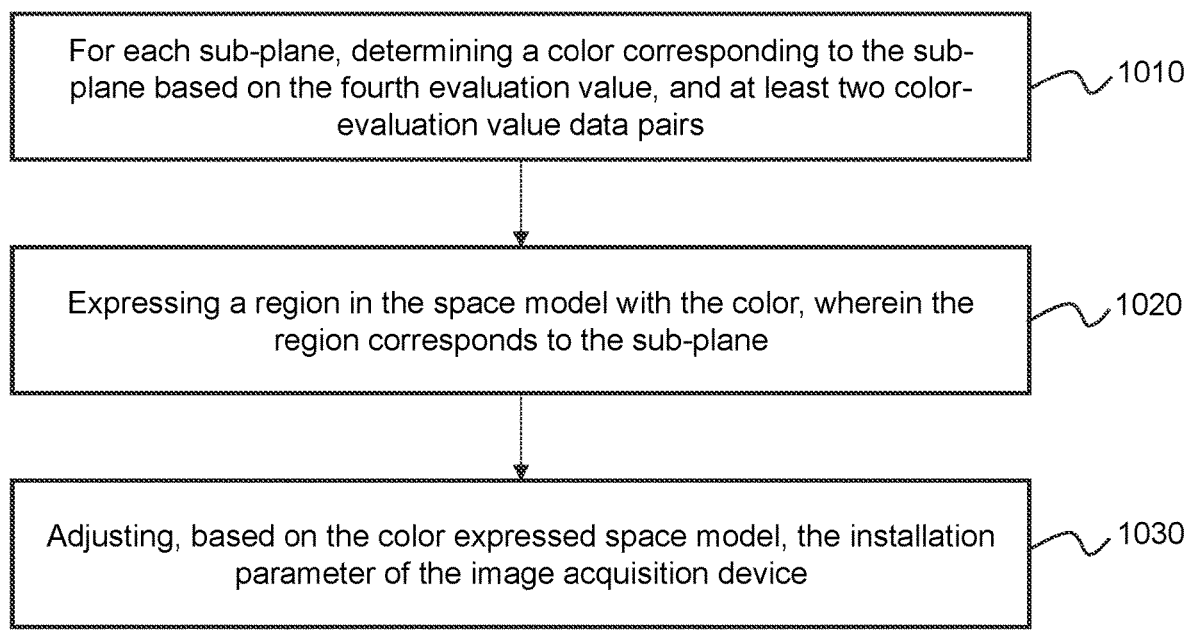
FIG. 10 is a flowchart illustrating an exemplary process for adjusting the installation parameter of the image acquisition device according to some embodiments of the present disclosure.

FIG. 10 is a flowchart illustrating an exemplary process 1000 for adjusting the installation parameter of the image acquisition device according to some embodiments of the present disclosure. In some embodiments, the process 1000 may be executed by the computing device 100. For example, the process 1000 may be implemented as a set of instructions (e.g., an application) stored in one or more storage devices (e.g., the storage 130) and invoked and/or executed by the processor 110 (or the adjusting module 230 illustrated in FIG. 2). The operations of the process 1000 presented below are intended to be illustrative. In some embodiments, the process may be accomplished with one or more additional operations not described, and/or without one or more of the operations discussed. Additionally, the order of the operations of the process 1000 as illustrated in FIG. 10 and described below is not intended to be limiting.

In 1010, the processor 110 may determine a color corresponding to the sub-plane based on the fourth evaluation value, and at least two color-evaluation value data pairs. The color-evaluation value data pair may include a preset color and a corresponding preset evaluation value.

In some embodiments, the color may have a correspondence with the first evaluation value of the target region. A pixel value such as a RGB value (r, g, b) or a transparency may be used to represent the color, and the greater of the RGB value, the greater of the first evaluation value, vice versa. In some embodiments, the at least two color-evaluation value data pairs may be stored (e.g., in the storage 130) in advance, and the processor 110 may access the color-evaluation value data pairs whenever.

In some embodiments, the processor 110 may store (e.g., in the storage 130) correspondence relationships between preset pixel values and corresponding preset evaluation values. In some embodiments, the pixel values may include, but are not limited to, preset colors, preset transparencies, or the like. In some embodiments, the processor 110 may store a one-to-one correspondence relationship between a preset evaluation value and a pixel value. In some embodiments, the processor 110 may store a correspondence relationship between a range of each preset evaluation value and a pixel value. For the fourth evaluation value of each sub-plane, the processor 110 may determine the range to which the fourth evaluation value belongs, and determine a pixel value of the sub-plane according to the correspondence relationship. Alternatively, the processor 110 may also store the correspondence relationship between a maximum preset evaluation value and a pixel value, and the correspondence relationship between the minimum preset evaluation value and a pixel value.

In some embodiments, the processor 110 may determine the color corresponding to the sub-plane using a mathematical arithmetic. For illustration purpose, supposing that the pixel values of the preset colors include in the at least two color-evaluation value data pairs are $RGB_m$ ($r_m$, $g_m$, $b_m$) and $RGB_n$ ($r_n$, $g_n$, $b_n$), and the corresponding preset evaluation values are $PPM_m$ and $PPM_n$, respectively. The processor 110 may determine a color $RGB_k$ ($r_k$, $g_k$, $b_k$) corresponding to a fourth evaluation value $PPM_k$ of the sub-plane using a difference algorithm according to following Equation (8)-(10):

$$r_k = \frac{r_m - r_n}{PPM_m - PPM_n} \times (PPM_k - PPM_n) + r_n \quad (8)$$

$$g_k = \frac{g_m - g_n}{PPM_m - PPM_n} \times (PPM_k - PPM_n) + g_n \quad (9)$$

$$b_k = \frac{b_m - b_n}{PPM_m - PPM_n} \times (PPM_k - PPM_n) + b_n. \quad (10)$$

Assuming that the color corresponding to $PPM_m$ is $RGB_m$ (255,0,0), the color corresponding to $PPM_n$ is $RGB_n$ (20,0,0), the projection plane may be displayed in red color. The sub-plane with high clarity may be in dark red, and the sub-plane with low clarity may be in light red.

In 1020, the processor 110 may express a region in the space model with the color. The region may correspond to the sub-plane.

As illustrated in FIG. 8, the processor 110 may establish a 3D space model according to the image related to the target region. During the determination operation of the perspective view, the 3D space model may be projected on projection plane. Every point included in the projection plane may correspond to a point of the space model, and every sub-plane may correspond to a region of the space model. After determining the color corresponding to each sub-plane, the processor 110 may express the region in the space model with the color. For example, the processor 110 may map the image on the projection plane 1120 onto the space model, and replace an original color of the region with the color of the corresponding sub-plane determined in operation 1010. By viewing the expressed 3D space model, a region with a high clarity is in a dark color, and a region with low clarity is in a light color. Additionally, for there are more than one preset installation positions in the space model, the projection plane corresponding to different preset installation positions may be different, result in the different of the color corresponding to the sub-plane in different projection plane, and the different region corresponding to the sub-plane in different projection plane. Thus, one or more overlapping region may be generated among the regions belongs to different projection plane. When expressing the space model with the color of the one or more projection planes, the overlapping region may be expressed with the highest pixel value among the pixel values of the colors of the regions which generate the overlapping region.

In 1030, the processor 110 may adjust the installation parameter of the image acquisition device based on the color expressed space model.

In some embodiments, since different sun-planes may correspond to different fourth evaluation values, the colors expressed on space model may be in a gradient distribution. For example, a region with a high clarity may be in a dark color, and a region with low clarity may be in a light color. Therefore, the processor 110 may clearly obtain the clarity information related to the target region from the gradient distribution. Accordingly, if the clarity information does not satisfy a preset condition, for example, the color indicated by the pixel value is less than a pixel value threshold, the processor 110 may adjust the installation parameter of the image acquisition device, for example, an installation position. Then, the evaluation value determination process (for example, process 400 and/or process 800) and/or the color expressed space model determination process (for example, process 1000) may be re-executed. The processor 110 may determine whether the new obtained clarity information satisfies the preset condition again. The above operation may be an iterative process, and may be ended until the clarity information satisfies the preset condition.

In some embodiments, for a current number of the at least one image acquisition device, the processor 110 may obtain one or more color expressed space model corresponding to the current number of the at least one image acquisition device, respectively. Furthermore, the processor 110 may adjust the current number of the at least one image acquisition device based on the one or more color expressed space model.

For example, according to the gradient distribution of the expressed space model, the user may adjust the installation position, the installation angle of view, or the like, of the image acquisition device. If a portion of the target region is not in red, the processor 110 may determine that the currently image acquisition device cannot monitor the target region in all directions. And the processor 110 may determine to add one or more image acquisition devices, which may be arranged according to unmonitored regions.

It should be noted that the above description regarding the process 1000 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 1000 may include one or more additional operations or one or more of the operations mentioned above may be omitted. In some embodiments, an operation of the process 1000 may be divided into a plurality of sub-operations.

In some embodiments, by establishing the space model related to the target region, the processor 110 may mark the target region with information such as conspicuous colors or transparencies, and indicate the monitoring clarity by using depth of the colors and/or level of the transparencies. The monitoring simulation effect may be seen at a glance, which may greatly reduce the difficulty of designing the monitoring scheme in a large monitoring region. At the same time, for monitoring the overlapping region, the clearest color may be displayed, which may solve the problem that it is difficult to judge the clarity in overlapping regions.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object to be recognized oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local part network (LAN) or a wide part network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A method for selecting an image acquisition device, implemented on a machine including at least one processor and at least one storage device, the method comprising:
   obtaining a set of device parameters corresponding to at least one image acquisition device, wherein each device parameter corresponds to an image acquisition device, the device parameter includes a pixel size and a focal length;
   for each image acquisition device,
      determining one or more first evaluation values of a target region based at least on the device parameter of the image acquisition device, wherein each first evaluation value corresponds to a first installation parameter of the image acquisition device;
      designating the image acquisition device as a target image acquisition device in response to a determination that at least one first evaluation value is greater than or equal to an evaluation value threshold; and
      determining at least one target installation parameter of the target image acquisition device from the at least one first installation parameter corresponding to the at least one first evaluation value which is greater than or equal to the evaluation value threshold;
      wherein the determining the first evaluation value corresponding to the first installation parameter includes:
         dividing the target region into a plurality of sub-regions;
         for each sub-region, determining a second evaluation value based on the device parameter and the first installation parameter; and
         determining a first average value of the plurality of second evaluation values as the first evaluation value.

2. The method of claim 1, wherein:
   the first installation parameter at least includes an installation position of the image acquisition device;
   the determining the second evaluation value includes:
      determining a first vertical distance and a first horizontal distance based on the installation position of the image acquisition device and a location of the sub-region;
      determining a first distance based on the vertical distance and the horizontal distance; and
      determining the second evaluation value based on the first distance, the pixel size, and the focal length.

3. The method of claim 1, wherein:
   the first installation parameter at least includes an installation position of the image acquisition device;
   the determining the second evaluation value includes:
      determining a second vertical distance and a second horizontal distance based on the installation position of the image acquisition device and a location of the sub-region;
      obtaining a height and a width of the sub-region;
      determining a first angle and a second angle based on the second vertical distance, the second horizontal distance, the height, and the width;
      determining, based on a preset distortion parameter, a first image height corresponding to the first angle and a second image height corresponding to the second angle, wherein the preset distortion parameter includes a plurality of angle-image height data pairs; and
      determining the second evaluation value based on the first image height, the second image height, the width, and the pixel size.

4. The method of claim 3, wherein the determining, based on the preset distortion parameter, the first image height corresponding to the first angle includes:
   determining a plurality of first differences between the first angle and first preset angles included in a first plurality of angle-image height data pairs;
   obtaining a 1st minimum value and a 1st second minimum value among the plurality of first differences;
   determining a first preset angle corresponding to the 1st minimum value, and a second preset angle corresponding to the 1st second minimum value;
   determining, based on the first plurality of angle-image height data pairs, a first preset image height corresponding to the first preset angle, and a second preset image height corresponding to the second preset angle; and
   determining the first image height based on the first preset image height and the second preset image height.

5. The method of claim 3, wherein the determining, based on the preset distortion parameter, the second image height corresponding to the second angle includes:
   determining a plurality of second differences between the second angle and second preset angles included in a second plurality of angle-image height data pairs;
   obtaining a 2nd minimum value and a 2nd second minimum value among the plurality of second differences;
   determining a third preset angle corresponding to the 2nd minimum value, and a fourth preset angle corresponding to the 2nd second minimum value;
   determining, based on the second plurality of angle-image height data pairs, a third preset image height corresponding to the third preset angle, and a fourth preset image height corresponding to the fourth preset angle; and
   determining the second image height based on the third preset image height and the fourth preset image height.

6. The method of claim 1, wherein the determining the first evaluation value corresponding to the first installation parameter includes:
   obtaining an image related to the target region;
   obtaining a space model based on the image;
   determining a perspective view based on the device parameter, the first installation parameter, and the space model; and
   determining a third evaluation value of a projection plane of the perspective view as the first evaluation value of the target region.

7. The method of claim 6, wherein the determining the third evaluation value of the projection plane of the perspective view includes:
   dividing the projection plane into a plurality of sub-planes;
   for each sub-plane,
      determining a line passing through a center of the sub-plane and an installation position of the image acquisition device, wherein the installation position is included in the first installation parameter;
      determining an intersection between the target region and the line;
      determining a second distance between the intersection and the installation position;
      determining a fourth evaluation value based on the second distance, the pixel size, and the focal length; and determining a second average value of the plurality of fourth evaluation values as the third evaluation value.

8. The method of claim 7, further comprising:
for each sub-plane,
determining a color corresponding to the sub-plane based on the fourth evaluation value, and at least two color-evaluation value data pairs, wherein each color-evaluation value data pair includes a preset color and a corresponding preset evaluation value;
expressing a region in the space model with the color, wherein the region corresponds to the sub-plane; and
adjusting, based on the color expressed space model, the first installation parameter of the image acquisition device.

9. The method of claim 8, further comprising:
for a current number of the at least one image acquisition device,
obtaining one or more color expressed space models corresponding to the current number of the at least one image acquisition device, respectively; and
adjusting the current number of the at least one image acquisition device based on the one or more color expressed space models.

10. The method of claim 1, further comprising:
replacing the image acquisition device with a new image acquisition device or adjusting the first installation parameter corresponding to the image acquisition device in response to a determination that the one or more first evaluation values are less than the evaluation value threshold.

11. A system for selecting an image acquisition device, comprising:
at least one storage medium including a set of instructions; and
at least one processor in communication with the at least one storage medium, wherein when executing the instructions, the at least one processor is configured to direct the system to perform operations including:
obtaining a set of device parameters corresponding to at least one image acquisition device, wherein each device parameter corresponds to an image acquisition device, the device parameter includes a pixel size and a focal length;
for each image acquisition device,
determining one or more first evaluation values of a target region based at least on the device parameter of the image acquisition device, wherein each first evaluation value corresponds to a first installation parameter of the image acquisition device;
designating the image acquisition device as a target image acquisition device in response to a determination that at least one first evaluation value is greater than or equal to an evaluation value threshold; and
determining at least one target installation parameter of the target image acquisition device from the at least one first installation parameter corresponding to the at least one first evaluation value which is greater than or equal to the evaluation value threshold;
wherein the determining the first evaluation value corresponding to the first installation parameter includes:
dividing the target region into a plurality of sub-regions;
for each sub-region, determining a second evaluation value based on the device parameter and the first installation parameter; and
determining a first average value of the plurality of second evaluation values as the first evaluation value.

12. The system of claim 11, wherein:
the first installation parameter at least includes an installation position of the image acquisition device;
the determining the second evaluation value includes:
determining a first vertical distance and a first horizontal distance based on the installation position of the image acquisition device and a location of the sub-region;
determining a first distance based on the vertical distance and the horizontal distance; and
determining the second evaluation value based on the first distance, the pixel size, and the focal length.

13. The system of claim 11, wherein:
the first installation parameter at least includes an installation position of the image acquisition device;
the determining the second evaluation value includes:
determining a second vertical distance and a second horizontal distance based on the installation position of the image acquisition device and a location of the sub-region;
obtaining a height and a width of the sub-region;
determining a first angle and a second angle based on the second vertical distance, the second horizontal distance, the height, and the width;
determining, based on a preset distortion parameter, a first image height corresponding to the first angle and a second image height corresponding to the second angle, wherein the preset distortion parameter includes a plurality of angle-image height data pairs; and
determining the second evaluation value based on the first image height, the second image height, the width, and the pixel size.

14. The system of claim 13, wherein the determining, based on the preset distortion parameter, the first image height corresponding to the first angle includes:
determining a plurality of first differences between the first angle and first preset angles included in a first plurality of angle-image height data pairs;
obtaining a 1st minimum value and a 1st second minimum value among the plurality of first differences;
determining a first preset angle corresponding to the 1st minimum value, and a second preset angle corresponding to the 1st second minimum value;
determining, based on the first plurality of angle-image height data pairs, a first preset image height corresponding to the first preset angle, and a second preset image height corresponding to the second preset angle; and
determining the first image height based on the first preset image height and the second preset image height.

15. The system of claim 13, wherein the determining, based on the preset distortion parameter, the second image height corresponding to the second angle includes:
determining a plurality of second differences between the second angle and a second preset angles included in a second plurality of angle-image height data pairs;
obtaining a 2nd minimum value and a 2nd second minimum value among the plurality of second differences;

determining a third preset angle corresponding to the 2nd minimum value, and a fourth preset angle corresponding to the 2nd second minimum value;

determining, based on the second plurality of angle-image height data pairs, a third preset image height corresponding to the third preset angle, and a fourth preset image height corresponding to the fourth preset angle; and determining the second image height based on the third preset image height and the fourth preset image height.

16. The system of claim 11, wherein the determining the first evaluation value corresponding to the first installation parameter includes:

obtaining an image related to the target region;

obtaining a space model based on the image;

determining a perspective view based on the device parameter, the first installation parameter, and the space model; and determining a third evaluation value of a projection plane of the perspective view as the first evaluation value of the target region.

17. The system of claim 16, wherein the determining the third evaluation value of the projection plane of the perspective view includes:

dividing the projection plane into a plurality of sub-planes;

for each sub-plane, determining a line passing through a center of the sub-plane and an installation position of the image acquisition device, wherein the installation position is included in the installation parameter;

determining an intersection between the target region and the line;

determining a second distance between the intersection and the installation position;

determining a fourth evaluation value based on the second distance, the pixel size, and the focal length; and determining a second average value of the plurality of fourth evaluation values as the third evaluation value.

18. A non-transitory computer readable medium, comprising at least one set of instructions, wherein when executed by at least one processor, the at least one set of instructions direct the at least one processor to effectuate a method, the method comprising:

obtaining a set of device parameters corresponding to at least one image acquisition device, wherein each device parameter corresponds to an image acquisition device, the device parameter includes a pixel size, and a focal length;

for each image acquisition device, determining one or more first evaluation values of a target region based at least on the device parameter of the image acquisition device, wherein each first evaluation value corresponds to a first installation parameter of the image acquisition device;

designating the image acquisition device as a target image acquisition device in response to a determination that at least one first evaluation value is greater than or equal to an evaluation value threshold; and determining at least one target installation parameter of the target image acquisition device from the at least one first installation parameter corresponding to the at least one first evaluation value which is greater than or equal to the evaluation value threshold;

wherein the determining the first evaluation value corresponding to the first installation parameter includes:

dividing the target region into a plurality of sub-regions;

for each sub-region, determining a second evaluation value based on the device parameter and the first installation parameter; and determining a first average value of the plurality of second evaluation values as the first evaluation value.

* * * * *